(12) United States Patent  (10) Patent No.: US 7,941,786 B2
Scott et al.  (45) Date of Patent: May 10, 2011

(54) CONFIGURABLE CONTROLLING DEVICE AND ASSOCIATED CONFIGURATION DISTRIBUTION SYSTEM AND METHOD

(75) Inventors: Wayne Scott, Newport Beach, CA (US); Christopher Alan Chambers, Stanton, CA (US); Han-Sheng Yuh, Diamond Bar, CA (US)

(73) Assignee: Universal Electronics Inc., Cypress, CA (US)

( * ) Notice: Subject to any disclaimer, the term of this patent is extended or adjusted under 35 U.S.C. 154(b) by 1114 days.

(21) Appl. No.: 11/357,681

(22) Filed: Feb. 16, 2006

(65) Prior Publication Data

US 2006/0143572 A1  Jun. 29, 2006

Related U.S. Application Data

(63) Continuation-in-part of application No. 11/218,900, filed on Sep. 2, 2005, now Pat. No. 7,266,777.

(60) Provisional application No. 60/705,926, filed on Aug. 5, 2005, provisional application No. 60/608,183, filed on Sep. 8, 2004.

(51) Int. Cl.
*G06F 9/44* (2006.01)
(52) U.S. Cl. ........ 717/121; 717/120; 717/103; 709/203; 709/220; 707/770; 707/802
(58) Field of Classification Search .......... 715/762–763, 715/740; 717/168–173
See application file for complete search history.

(56) References Cited

U.S. PATENT DOCUMENTS

| | | | |
|---|---|---|---|
| 5,555,369 A | | 9/1996 | Menendez et al. |
| 5,602,993 A | * | 2/1997 | Stromberg .................... 717/173 |
| 5,909,545 A | | 6/1999 | Frese, II et al. |
| 5,940,074 A | | 8/1999 | Britt, Jr. et al. |
| 5,960,189 A | * | 9/1999 | Stupek et al. .................. 717/169 |
| 6,054,983 A | * | 4/2000 | Simonoff et al. ............. 715/738 |
| 6,151,606 A | * | 11/2000 | Mendez ........................ 707/201 |
| 6,167,567 A | * | 12/2000 | Chiles et al. .................. 717/173 |
| 6,170,065 B1 | * | 1/2001 | Kobata et al. ..................... 714/7 |
| 6,182,094 B1 | * | 1/2001 | Humpleman et al. ........ 715/234 |
| 6,195,694 B1 | * | 2/2001 | Chen et al. .................... 709/220 |
| 6,211,870 B1 | | 4/2001 | Foster |

(Continued)

FOREIGN PATENT DOCUMENTS

WO  00/17738  3/2000

(Continued)

OTHER PUBLICATIONS

Title: Design and evaluation of the distributed software component framework for distributed communication architectures, author: Bakker, J.-L, dated:Nov. 5, 1998, source: IEEE.*

(Continued)

*Primary Examiner* — Chameli C Das
(74) *Attorney, Agent, or Firm* — Greenberg Traurig, LLP

(57) ABSTRACT

A configurable controlling device and associated program that allows a consumer to modify on a personal computer for downloading to the controlling device configuration data which is used to cause the controlling device to perform a function, such as to transmit a command to an appliance, to change the user interface page being displayed, etc. The editor program provides for managed uploading of modified configuration data to a central server facility from which the uploaded, modified configuration data may be made available for managed download to one or more remotely-located controlling devices.

15 Claims, 22 Drawing Sheets

U.S. PATENT DOCUMENTS

| | | | | |
|---|---|---|---|---|
| 6,308,283 | B1 * | 10/2001 | Galipeau et al. | 714/6 |
| 6,317,143 | B1 | 11/2001 | Wugofski | |
| 6,437,836 | B1 | 8/2002 | Huang et al. | |
| 6,487,717 | B1 | 11/2002 | Brunemann et al. | |
| 6,505,244 | B1 * | 1/2003 | Natarajan et al. | 709/223 |
| 6,516,327 | B1 * | 2/2003 | Zondervan et al. | 707/200 |
| 6,539,425 | B1 * | 3/2003 | Stevens et al. | 709/220 |
| 6,587,067 | B2 | 7/2003 | Darbee et al. | |
| 6,654,771 | B1 * | 11/2003 | Parham et al. | 707/204 |
| 6,747,591 | B1 * | 6/2004 | Lilleness et al. | 341/176 |
| 6,751,794 | B1 * | 6/2004 | McCaleb et al. | 717/168 |
| RE38,598 | E | 9/2004 | Frese, II et al. | |
| 6,898,424 | B2 | 5/2005 | Nishida | |
| 6,909,378 | B1 | 6/2005 | Lambrechts et al. | |
| 6,989,763 | B2 * | 1/2006 | Wall et al. | 340/825.69 |
| 7,024,548 | B1 * | 4/2006 | O'Toole, Jr. | 713/1 |
| 7,055,759 | B2 | 6/2006 | Wacker et al. | |
| 7,218,243 | B2 * | 5/2007 | Hayes et al. | 340/825.72 |
| 7,266,777 | B2 * | 9/2007 | Scott et al. | 715/762 |
| 7,398,524 | B2 * | 7/2008 | Shapiro | 717/175 |
| 7,433,943 | B1 * | 10/2008 | Ford | 709/223 |
| 7,526,728 | B2 * | 4/2009 | Apparao et al. | 715/745 |
| 2001/0011953 | A1 | 8/2001 | Shintani et al. | |
| 2001/0042073 | A1 * | 11/2001 | Saether et al. | 707/203 |
| 2002/0063633 | A1 * | 5/2002 | Park | 340/825.69 |
| 2002/0063735 | A1 * | 5/2002 | Tamir et al. | 345/735 |
| 2002/0100036 | A1 * | 7/2002 | Moshir et al. | 717/173 |
| 2002/0124064 | A1 * | 9/2002 | Epstein et al. | 709/221 |
| 2002/0143805 | A1 * | 10/2002 | Hayes et al. | 707/500 |
| 2002/0190956 | A1 * | 12/2002 | Klein et al. | 345/169 |
| 2002/0194314 | A1 * | 12/2002 | Kouznetsov et al. | 709/220 |
| 2002/0199025 | A1 | 12/2002 | Kutay et al. | |
| 2003/0028538 | A1 * | 2/2003 | Eikenbery | 707/10 |
| 2003/0095156 | A1 * | 5/2003 | Klein et al. | 345/864 |
| 2003/0103088 | A1 * | 6/2003 | Dresti et al. | 345/835 |
| 2003/0117427 | A1 * | 6/2003 | Haughawout et al. | 345/710 |
| 2003/0140120 | A1 | 7/2003 | Hartman | |
| 2003/0141987 | A1 * | 7/2003 | Hayes | 340/825.72 |
| 2003/0143991 | A1 * | 7/2003 | Minear et al. | 455/419 |
| 2003/0189509 | A1 * | 10/2003 | Hayes et al. | 341/176 |
| 2003/0189905 | A1 * | 10/2003 | Lee | 370/254 |
| 2003/0237082 | A1 | 12/2003 | Thurlow | |
| 2004/0030768 | A1 * | 2/2004 | Krishnamoorthy et al. | 709/223 |
| 2004/0044454 | A1 | 3/2004 | Ross et al. | |
| 2004/0049771 | A1 * | 3/2004 | Yu | 717/172 |
| 2004/0100490 | A1 | 5/2004 | Boston et al. | |
| 2004/0103032 | A1 * | 5/2004 | Maggio | 705/14 |
| 2004/0107417 | A1 * | 6/2004 | Chia et al. | 717/171 |
| 2004/0133629 | A1 * | 7/2004 | Reynolds et al. | 709/202 |
| 2004/0210825 | A1 * | 10/2004 | Novak et al. | 715/500.1 |
| 2004/0235463 | A1 | 11/2004 | Patel | |
| 2005/0028104 | A1 * | 2/2005 | Apparao et al. | 715/738 |
| 2005/0071749 | A1 | 3/2005 | Goerke et al. | |
| 2005/0256590 | A1 | 11/2005 | Choi | |
| 2005/0267928 | A1 * | 12/2005 | Anderson et al. | 709/200 |
| 2006/0056802 | A1 * | 3/2006 | Seo et al. | 386/69 |
| 2006/0244625 | A1 * | 11/2006 | Verdickt et al. | 340/825.22 |
| 2007/0155418 | A1 | 7/2007 | Shau et al. | |
| 2007/0165555 | A1 * | 7/2007 | Deng et al. | 370/318 |
| 2007/0169073 | A1 * | 7/2007 | O'Neill et al. | 717/168 |
| 2010/0223551 | A1 * | 9/2010 | Twig et al. | 715/712 |
| 2010/0235633 | A1 * | 9/2010 | Asano et al. | 713/167 |

FOREIGN PATENT DOCUMENTS

| | | |
|---|---|---|
| WO | WO 0039772 | 7/2000 |

OTHER PUBLICATIONS

Title: Secure remote control of field-programmable network devices, Song, H et al, dated: Apr. 23, 2004, source: IEEE.*

Office Action issued on May 29, 2009 for U.S. Appl. No. 11/479,547.

* cited by examiner

| Description | Data Format | Name | Example | Count |
|---|---|---|---|---|
| Project XML File | XML | *ProjectName*.nevoproj | MyHouse.nevoproj | 1 |
| Sitemap XML File | XML | Sitemap.xml | | 1 |
| Page XML File | XML | p_*PageId*.xml | p_0001.xml | 1 per Page |
| Page Collection XML File | XML | pg_*PageCollectionId*.xml | pg_0001.xml | 1 per Page Collection |
| Device XML File | XML | dv_*DeviceId*.xml | dv_0001.xml | 1 per Device |
| NevoLink XML File | XML | bl_*NevoLinkId*.xml | bl_0001.xml | 1 per NevoLink |
| Media Zone XML File | XML | mz_*MediaZoneId*.xml | mz_0001.xml | 1 per MediaZone |
| Resources File | Binary | AllResources.resources | | 1 |

```
<ProjectSettings>
  <ResourceManagerInputDirectory>C:\Program Files\Nevo\NevoStudio\Gallery\Buttons\Activities
  </ResourceManagerInputDirectory>
  <Project identity>
    <Installer ID>RQ1981PDL2</Installer ID>
    <Client>Mr. Hayes</Client>
    <Target device MAC>00:0B:6C:24:A2:6C</Target device MAC>
    <Project revision>1.3</Project revision>
    <Revision date>20060109</Revision date>
  </Project identity>
  <HomePageId>4</HomePageId>
  <NevoSlDeviceSettings>
    <AcPowerScheme>
      <BacklightIdle>300</BacklightIdle>
      <Brightness>80</Brightness>
      <Suspend>600</Suspend>
      <SystemIdle>300</SystemIdle>
      <UserIdle>150</UserIdle>
      <WifiTimeout>600</WifiTimeout>
    </AcPowerScheme>
    <BatteryPowerScheme>
      <BacklightIdle>300</BacklightIdle>
      <Brightness>80</Brightness>
      <Suspend>600</Suspend>
      <SystemIdle>300</SystemIdle>
      <UserIdle>150</UserIdle>
      <WifiTimeout>600</WifiTimeout>
    </BatteryPowerScheme>
    <Password>R7MEUjX2v5g/mxdm</Password>
    <TimeDisplayFormat>0</TimeDisplayFormat>
    <EnableWIFI>True</EnableWIFI>
  </NevoSlDeviceSettings>
</ProjectSettings>
```

```xml
<?xml version="1.0" encoding="utf-16" ?>
<SiteMap Version="1.0" Scale="0.5">
    <Node WidgetType="2" Widget="2" Location="450,200" Index="-1" Label="Home" Visible="False" />
    <Node WidgetType="1" Widget="4" Location="450,200" Index="-1" Label="Home Page" Collapsed="True" />
    <Node WidgetType="1" Widget="8" Location="620,200" Index="-1" Label="New Page 2" Collapsed="True" />
    <Node WidgetType="2" Widget="11" Location="450,699" Index="-1" Label="Sony TV" Collapsed="True" />
    <Node WidgetType="1" Widget="30" Index="-1" Label="HDTV STB Digits" Visible="False" Collapsed="True" />
    <Node WidgetType="1" Widget="44" Index="-1" Label="HDTV STB Setup" Visible="False" Collapsed="True" />
    <Node WidgetType="1" Widget="61" Index="-1" Label="HDTV STB Control" Visible="False" Collapsed="True" />
    <Node WidgetType="1" Widget="96" Index="-1" Label="Fastext" Visible="False" Collapsed="True" />
    <Node WidgetType="1" Widget="112" Index="-1" Label="HDTV STB Power" Visible="False" Collapsed="True" />
    <Link From="4" To="8" LinkType="1" />
    <Link From="30" To="44" LinkType="1" Visible="False" />
    <Link From="44" To="61" LinkType="1" Visible="False" />
    <Link From="61" To="96" LinkType="1" Visible="False" />
    <Link From="96" To="112" LinkType="1" Visible="False" />
</SiteMap>
```

```
<W STId="1" Id="30" Cn="HDTV STB Digits" Area="(0,25,240,295)" ShCap="T" FIUDF="F"
   FIC="-16777216" FIA="MC" FIN="Tahoma" FISz="8.25" FISy="0" FIFF="Tahoma" FIU="Point"
   SortOrder="10" InheritsBackground="F" InheritsFont="F" InheritsFunctionKeys="T"
   InheritsHardKeys="T" MasterPageId="1" PageGroupId="11" PageKeyGuideId="31"
   BackgroundInfoBackgroundType="ImageResource"
   BackgroundInfoColor="-1775639" BackgroundInfoImageResourceId="111">
. . . .
<W STId="4" Id="37" Cn="5" Area="(88,83,64,31)" ShCap="T" FIUDF="F" FIC="-16777216"
   FIA="MC" FIN="Tahoma" FISz="8.25" FISy="0" FIFF="Tahoma" FIU="Point" BT="Button1Center"
   BTSz="M" SymCode="5" SIA="MC" ShSI="F" SymSize="M" SymBr="Light" NIId="116" PIId="117">
   <MDA>
      <A AI="IR.Send 117,5" AT="1" AS="117" AD="5" />
   </MDA>
   <MUA>
      <A AI="IR.Stop 117" AT="6" AS="117" AD="0" />
   </MUA>
</W>
```

FIGURE 17

CONFIGURABLE CONTROLLING DEVICE AND ASSOCIATED CONFIGURATION DISTRIBUTION SYSTEM AND METHOD

RELATED APPLICATION INFORMATION

This application claims the benefit of and is a continuation-in-part of U.S. application Ser. No. 11/218,900 which in turn claims the benefit of U.S. Provisional Patent Application Nos. 60/608,183 filed on Sep. 8, 2004 and 60/705,926 filed on Aug. 5, 2005, all of which are incorporated herein by reference in their entirety.

BACKGROUND

The following relates generally to controlling devices and, more particularly, to a configurable controlling device having an associated editor program for use in configuring, among other things, the user interface of the controlling device as well as a system and method for distributing a configured user interface.

Editor programs for configuring a controlling device, such as a hand held remote control, are known in the art. For example, U.S. Pat. No. 6,211,870 illustrates and describes a controlling device which is programmable from a PC using an advanced, object-oriented user interface. More particularly, multiple user selectable screen objects may be created on the PC and transferred to the controlling device. The screen objects include screen layout and descriptions of soft keys to be displayed on a graphic display of the controlling device, as well as commands associated with the screen object, the soft keys and/or programmable keys on the remote control unit. The user may then select any of the screen objects once they have been transferred to the controlling device to control the operation of various appliances.

Similarly, PCT published application no. WO 00/39772 discloses a universal, programmable remote control device which has programming that enables an end-user to customize the remote control device through editing or programming of the control functionalities of the remote control device. The programming is achieved via a PC. In this manner, the control configuration created via an editor on the PC can be downloaded into the device. It is additionally disclosed that the PC has emulator software to test the configuration before downloading. It is to be understood that WO 00/39772 generally discloses the editor for the PHILIPS "PRONTO" remote control.

In the art there also exist online forums and user communities, such as prontoedit.com or remotecentral.com, which provide a means for consumers to exchange icons, program files, learned infrared codes, and/or general information concerning universal remote controls. It will be understood, however, that such online forums fail to provide for the exchange of data in a controlled and secure environment, or for the distribution of data in a targeted fashion.

Thus, while these known controlling devices and associated editor programs do work for their intended purpose, a need remains for an improved controlling device having an improved, associated editor program for use in configuring the controlling device. More particularly, a need exists for an editor program and associated configuration distribution facilities that allow a controlling device configuration, once created or modified by the editor program, to be accessed by and installed on a compatible, remotely-located configurable controlling device and/or to be shared amongst multiple users of like controlling devices in a managed and secure manner.

SUMMARY

In accordance with this and other needs, the following generally discloses an editor program for use in configuring a user interface of a controlling device, such as a hand-held remote control unit. The editor program allows a user to create on a personal computer for downloading to a controlling device a graphical user interface comprised of user interface pages having icons which icons, when activated on the controlling device, cause the controlling device to perform a function, such as to transmit a command to an appliance, to change the user interface page being displayed, etc. The editor program advantageously provides, among other things, for the visualization of links created between user interface pages, single step assigning of commands to logical groups of function keys (both iconic and hard keys), single step assigning of backgrounds to groups of user interface pages, and pre-rendering of user interface pages prior to downloading of the user interface to the controlling device. In an exemplary embodiment, once editing is completed graphical user interface definition and configuration data may be uploaded to a central location from which the graphical user interface definition and configuration data is accessible for downloading into a further, remotely-located controlling device in a more managed and secure manner.

The various advantages, features, properties and relationships of this improved user interface editor and configuration distribution system will be obtained from the following detailed description and accompanying drawings which set forth illustrative embodiments which are indicative of the various ways in which the principles thereof may be employed.

BRIEF DESCRIPTION OF THE DRAWINGS

For use in better understanding the user interface editor and configuration distribution system and method described hereinafter reference may be had to the following drawings in which:

FIGS. 14 through 17 illustrate an exemplary container file and associated sets of data structures suitable for storing an editable GUI as a local file on a PC;

DETAILED DESCRIPTION

Figure 1:
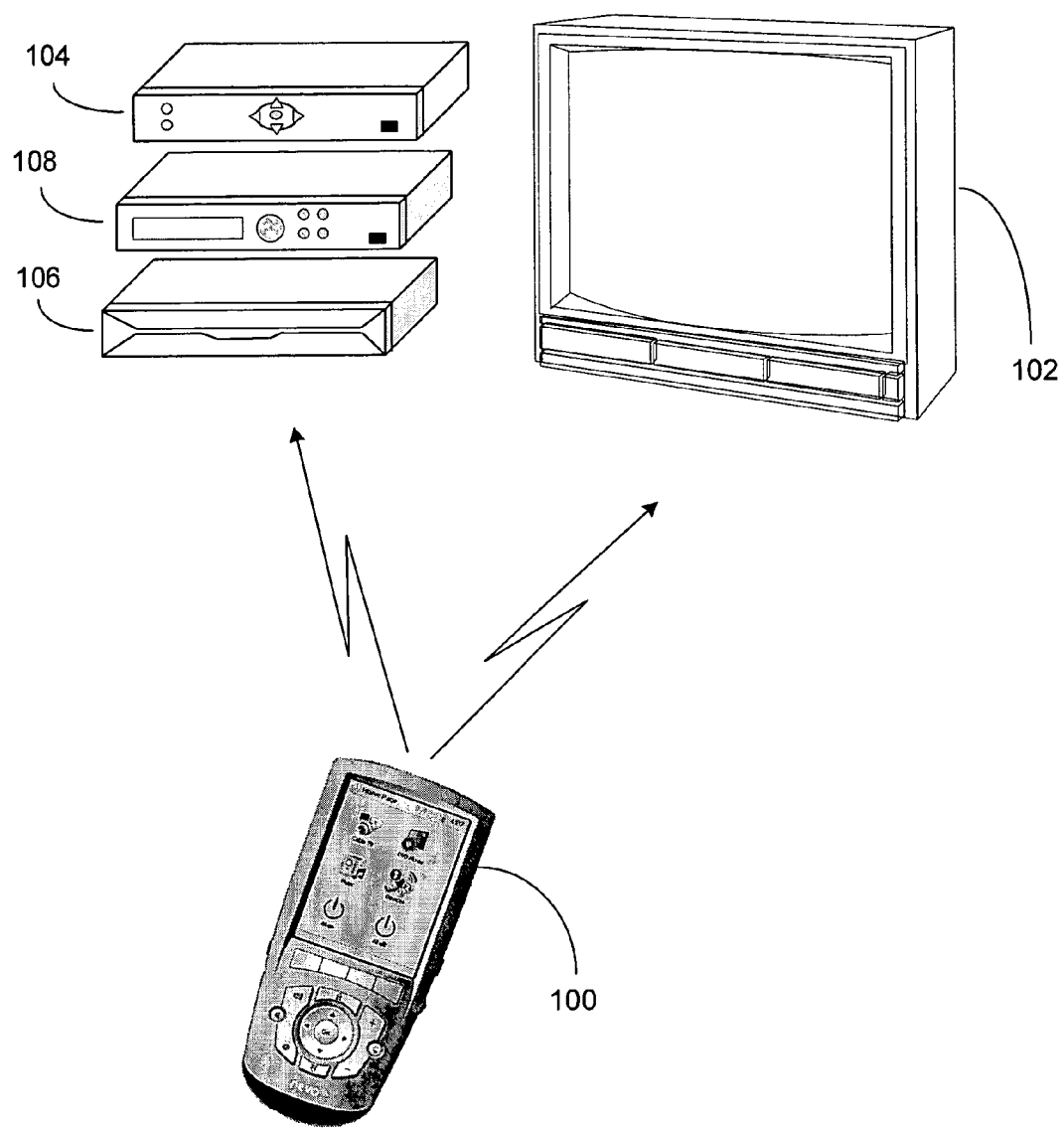
FIG. 1 illustrates an exemplary home entertainment system in which the exemplary controlling devices may be utilized.

The following discloses a controlling device having a face panel on which is carried a user interface activatable to cause transmission of at least one command to at least one appliance. Turning now to the figures, wherein like reference numerals refer to like elements, FIG. 1 illustrates an exemplary system including controllable appliances, such as a set top box ("STB") 104, a DVD player 106, an audio amplifier/receiver 108 and a television 102, as well as a controlling device 100. The controlling device 100 is capable of transmitting commands to the appliances, using any convenient IR, RF, Point-to-Point, or networked protocol, to cause the appliances to perform operational functions. While illustrated in the context of a STB 104 with DVD player 106, audio system 108 and television 102, it is to be understood that controllable appliances can include, but are not limited to, televisions, VCRs, DVRs, DVD players, cable or satellite converter set-top boxes (STBs), amplifiers, CD players, game consoles, home lighting, drapery controls, fans, HVAC systems, thermostats, personal computers, etc., and, as such, the instant exemplary disclosures are not intended to be limiting as to type or quantity of controllable appliances or equipment.

Figure 2:
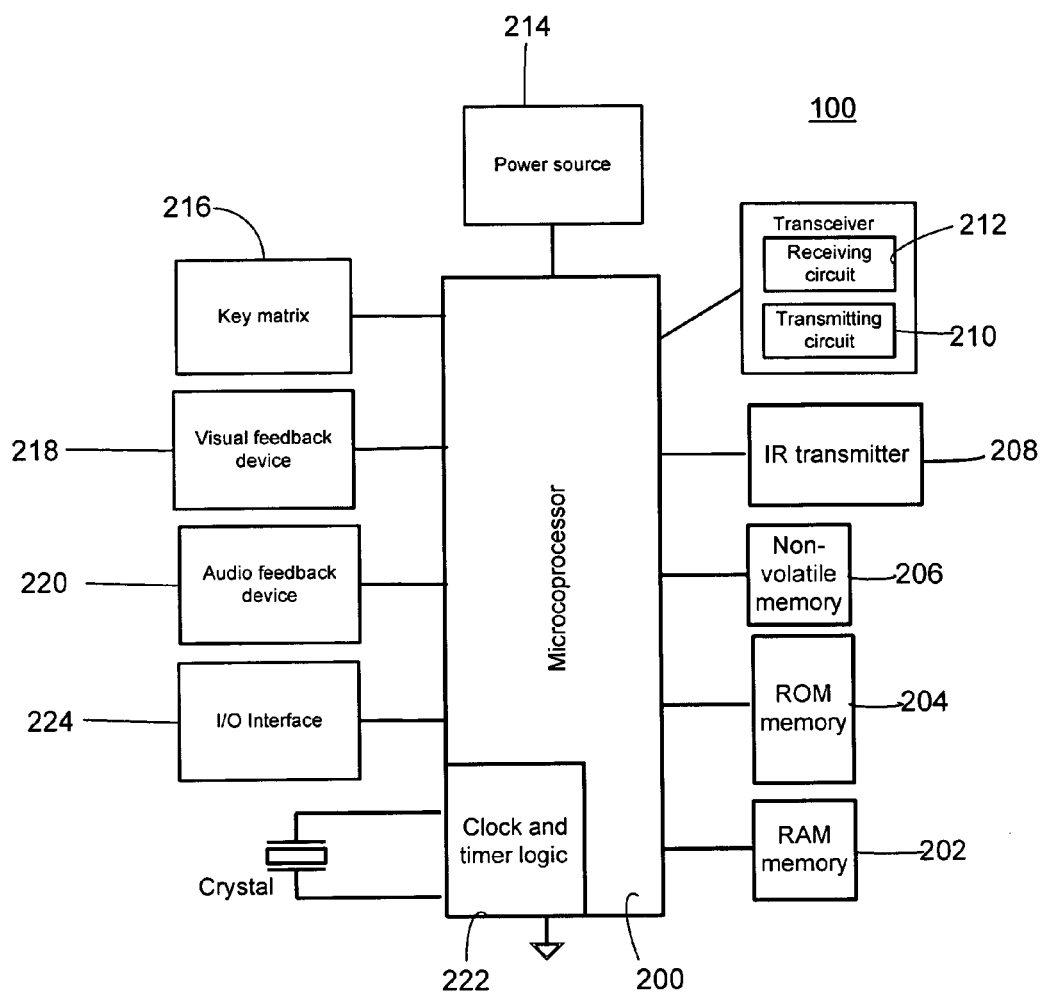
FIG. 2 illustrates a block diagram of components of an exemplary controlling device.

Turning now to FIG. 2, for use in transmitting command codes to one or more of the appliances, the controlling device 100 of the exemplary system may include, as needed for a particular application, a processor 200 coupled to a memory device (such as ROM memory 204, RAM memory 202, and/or a non-volatile memory 206), a key matrix 216 (e.g., physical buttons, a touch sensitive display with soft keys, or a combination thereof), an internal clock and timer 222, an IR (or RF) transmitter 208 for issuing commands to controlled appliances, RF (or IR) wireless transmission and reception circuit(s) 210, 212 and/or an physical input/output interface 224 for use in transferring data between the controlling device and external computing devices such as a PC, a network interface, etc., a means 218 to provide visual feedback to the user (e.g., LCD display or the like, which may underlay all or part of a touch sensitive portion of key matrix 216), a means 220 to provide audio feedback (speaker, buzzer, etc.) and a power supply 214 all as generally illustrated in FIG. 2. As will be understood by those of skill in the art, the memory device (s) may include executable instructions that are intended to be executed by the processor 200 to control the operation of the controlling device 100.

The non-volatile read/write memory 206, for example an EEPROM, battery-backed up RAM, Smart Card, memory stick, or the like, may be provided to store setup data and parameters as necessary. It is to be additionally understood that the memory devices may take the form of any type of readable media, such as, for example, ROM, RAM, SRAM, FLASH, EEPROM, Smart Card, memory stick, a chip, a hard disk, a magnetic disk, and/or an optical disk. Still further, it will be appreciated that some or all of the illustrated memory devices 202, 204, and 206 may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, receipt of a data or signal transmission, etc. In response to an event appropriate instructions within the memory may be executed. For example, when a command key is activated on the controlling device 100, the controlling device 100 may retrieve a command code corresponding to the activated command key from memory 204 or 206 and transmit the command code to a device in a format recognizable by the device. It will be appreciated that the instructions within the memory can be used not only to cause the transmission of command codes and/or data to the appliances but also to perform local operations. While not limiting, other local operations that may be performed by the controlling device 100 include execution of pre-programmed macro command sequences, displaying information/data, manipulating the appearance of a graphical user interface presented on a local LCD display 218, etc. In this context, co-pending U.S. patent application Ser. No. 10/288,727 entitled "User Interface for a Hand Held Remote Control Device," which is hereby incorporated by reference in its entirety, provides further detail which will not be repeated herein for the sake of brevity.

For convenience and economy of development effort, the software programming of controlling device 100 may utilize an underlying operating system such as, for example, MICROSOFT'S "WINDOWS CE" product.

Figure 3A:
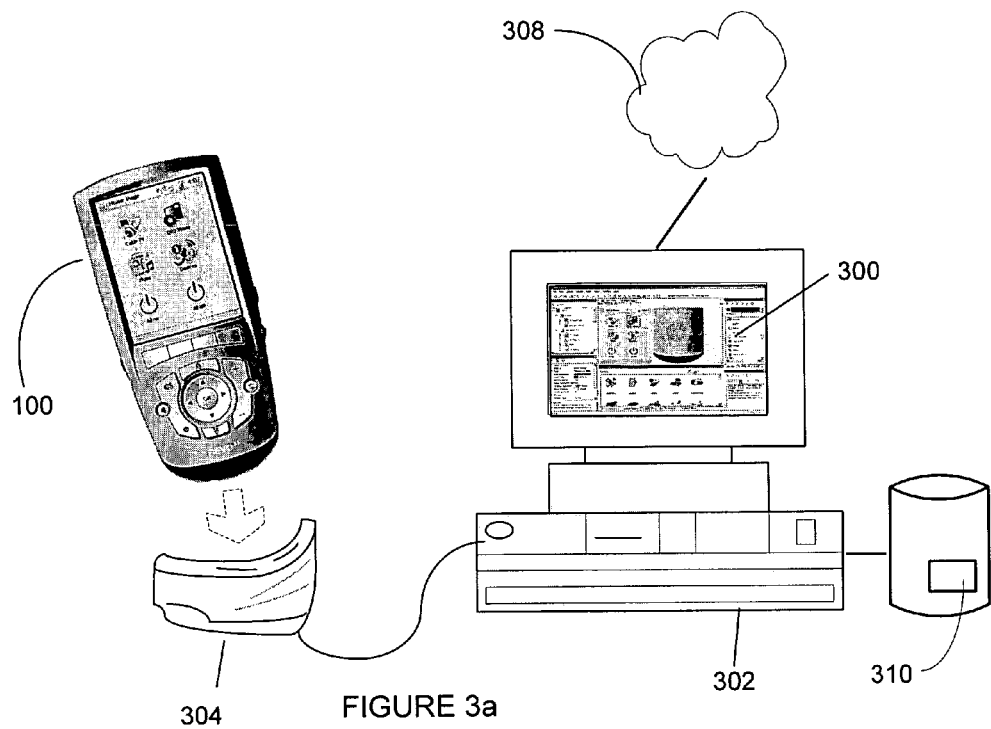
FIGS. 3a and 3b illustrates exemplary editing systems which may be used to configure and download the configuration, including a user interface, to an exemplary controlling device.
Figure 3B:
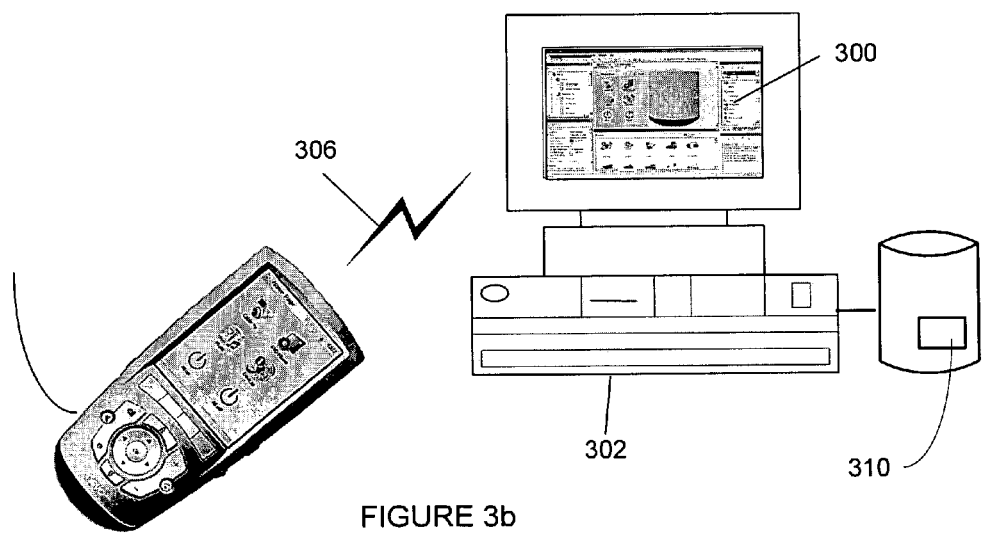
Figure 4:
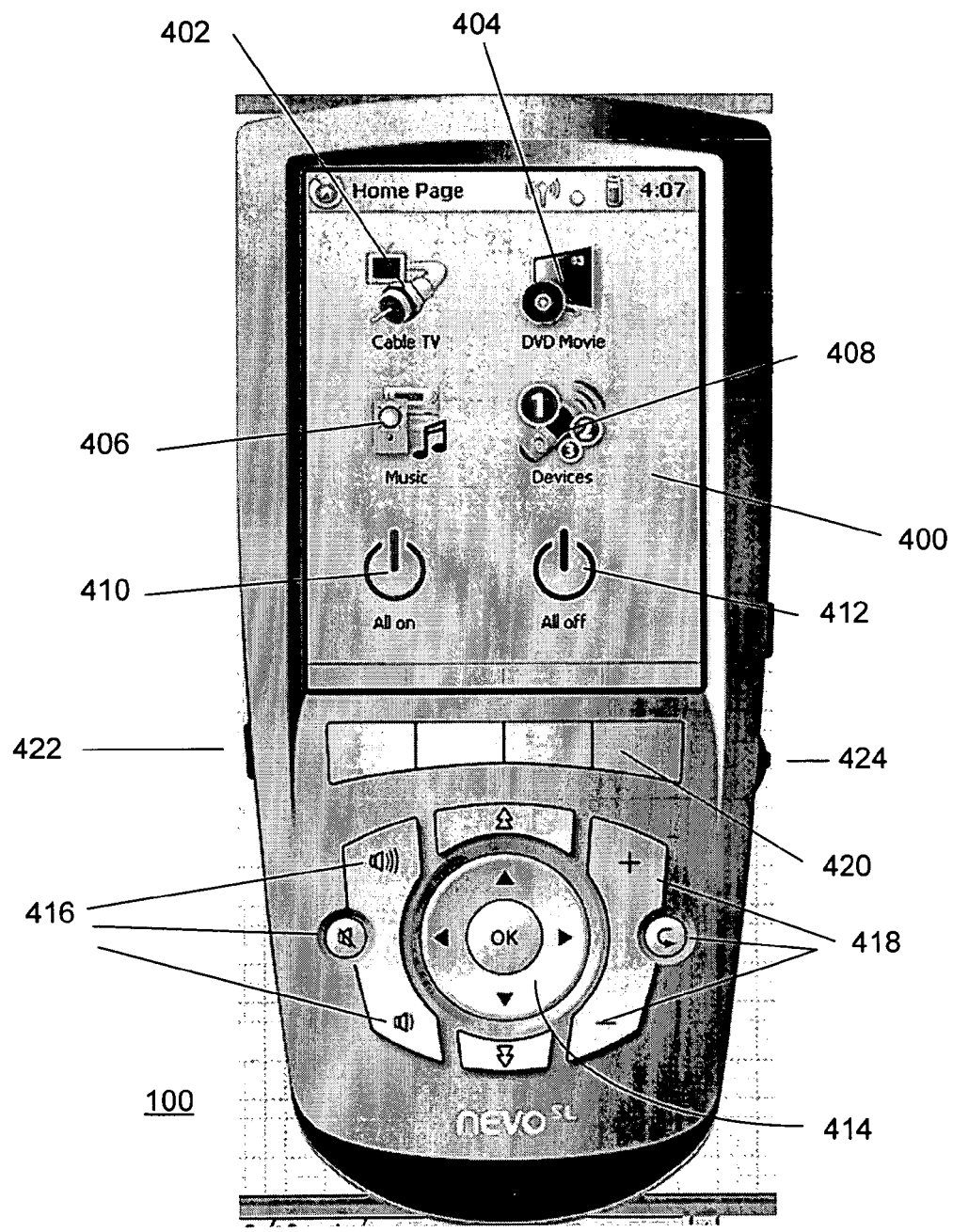
FIG. 4 illustrates an exemplary home page graphical user interface ("GUI") for the touch screen of a controlling device.

As contemplated in the above referenced and related U.S. patent application 11/218,900 and provisional applications 60/608,183 and 60/705,926, the graphical user interface ("GUI") and certain functionalities of controlling device 100 may be defined via a software based editing tool 300 which may be supplied as an application program to be installed on a PC 302 running an operating system, for example, MICROSOFT'S "WINDOWS XP" operating system, as generally illustrated in FIGS. 3a and 3b and described in further detail hereinafter. In the illustrative examples that follow, it will be appreciated by those skilled in the art that development tools such as MICROSOFT'S "VISUAL STUDIO," the C# programming language, and third party libraries such as, for example, those available from SYNCFUSION INC. (Morrisville, N.C.) and NORTHWOODS SOFTWARE (Nashua, N.H.) may be used to facilitate creation of the software comprising exemplary editing tool 300 and exemplary controlling device 100 GUI and functionality. In particular, MICROSOFT'S basic building blocks may be used to support networking, messaging (including operating system related messaging), graphic elements, printing, file access, Web services, etc., while SYNCFUSION'S suite may provide enhanced widgets such as tree control, docking panels, drag and drop handlers, MICROSOFT "OFFICE 2003" look and feel controls, etc., and NORTHWOOD'S library may provide diagram control which, for example, allows nodes and connectors to be depicted on a virtual drawing surface.

Editor application 300 may be offered by the manufacturer of the controlling device 100 on a CD ROM, for download from a Web site, etc., as appropriate for installation on a PC of the user's choice. Once the editor application is installed on the user's PC 302, the controlling device GUI may be created or revised using the editor application, stored locally as a file 310 on PC 302 and/or caused to be downloaded into controlling device 100 via a hardwired docking station 304, a wireless link 306 (e.g., IEEE 802.11, Bluetooth, Zigbee, etc.) or any other convenient means. Additionally, it will be appreciated that the editor application 300, although primarily resident on the user's local PC 302, may also be adapted to access additional data items from remotely located servers via the Internet 308, from appliances linked to the PC 302 via a home network, etc. Examples of such items may include, without limitation, IR command codes (e.g., to allow for support of new appliances), data which indicates operations supported by an appliance, device model number cross-references (e.g., for entering into the controlling device for set-up purposes as disclosed in, for example, U.S. Pat. No. 6,587,067), operational software updates for controlling device 100, etc. It will also be appreciated that in such an environment data may also be uploaded from PC 302 to a centralized repository, e.g., a remotely located, Internet accessible server. Such uploaded information may include, for example, current user configurations, learned IR code data, etc., and may be comprised of or derived from data stored locally on PC 302 (for example, file 310) and/or data retrieved from controlling device 100 during the times controlling device 100 is coupled to PC 302.

Certain aspects of the operation of exemplary controlling device 100 will now be discussed in conjunction with FIGS. 4 through 8. In this context, as will be appreciated by those familiar with the relevant art and/or with the previously referenced parent and U.S. provisional applications, the actual appearance and functionality of all the GUI pages in controlling device 100 represent only one instance of the output of editor application 300. It will thus be understood that the GUIs and associated functionality presented herein are by way of example only and not intended to be limiting in any way.

Controlling device 100 may include both a touch activated LCD screen 218 with soft keys (or other form of touch panel) and several groups of hard buttons 414, 416, 418. The hard buttons groups might comprise, for example, a volume control group 416 (e.g., volume up, down, and mute), a channel changing group 418 (e.g., channel up, down, and return), a navigation group embodied in disk 414 (e.g., for menu navigation and selection including up, down, left, right, and enter/select), and/or a row of programmable keys 420 (e.g., keys for supporting macros or other to-be-configured functions). Keys of the remote control having numerical labels (e.g., 0-9) may also be considered to be a logical group of keys that provide for digit entry operations.

Upon start of operation, or any time the "Home" button 422 (e.g., on the side of the device) is activated, an exemplary Home Page GUI 400 may be presented within the display. The illustrated, exemplary home Page 400 includes six touch-activated buttons. By way of example only, touching icon 402 may be used to initiate the activity of watching cable TV by causing controlling device 100 to transmit the commands required to power on cable STB 104, power on TV 102, select the TV input to which the cable STB is connected, and then cause the controlling device GUI to transition to the page (e.g., display having soft keys, an EPG, or the like) from which cable STB channel selection may be input (for further tuning, retrieving related content information, etc.). Touching icon 404 may be used to similarly cause the controlling device to place the entertainment system into a condition suitable for watching a DVD movie, while touching icon 406 may be used to cause the controlling device to place the system into a condition suitable for listening to music. Touching icon 410 and 412 may be used to cause the controlling device to power on or off all (or a subset) of the system devices, respectively. Touching icon 408 may be used to cause the controlling device to transition to another page 500 of the GUI, e.g., the GUI page illustrated in FIG. 5, from where individual device control pages may be called up, i.e., navigated to, using icons 502 (cable STB), 504 (TV), 506 (DVR player) or 508 (audio receiver). Examples of individual device control pages are shown in FIG. 6 (GUI page 600 having soft keys for use in controlling receiver input selection commands), FIG. 7 (GUI page 700 having soft keys for use in controlling DVD transport functions), and FIG. 8 (GUI page 800 having soft keys for controlling DVD slow motion controls). By way of further example of how GUI pages may be programmed to interrelate, activation of the "Slow" icon 702 in the DVD transport control page 700 (FIG. 7) not only will cause the controlling device to transmit a "slow" command to the DVD player but may also automatically cause the controlling device to transition the GUI to the DVD slow motion control page 800 (FIG. 8) in connection with the transmitting of the command. Similarly, touching the "play" icon 802 of the DVD slow motion control page 800 may cause the controlling device to transmit the "resume normal speed playback" command to the DVD player while causing the controlling device to transition the GUI back to DVD transport controls page 700. In this way it will be understood and appreciated that a plurality of commands and/or actions may be performed both locally on controlling device 100 and remotely on the various appliances under the control of controlling device 100 in response to a single or multiple interaction(s) by a user with the key matrix 216 of controlling device 100.

Figure 9:
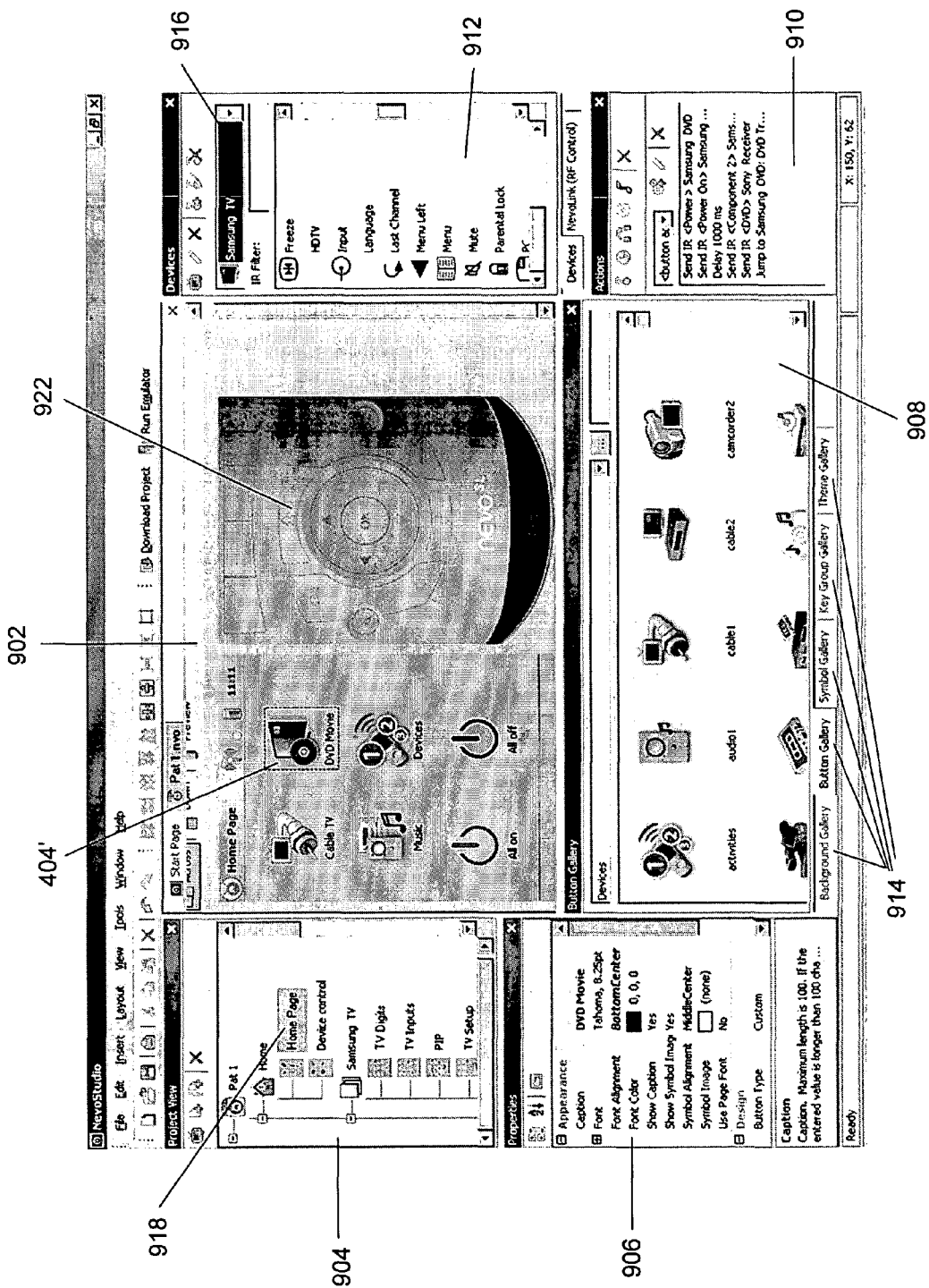
FIG. 9 illustrates an exemplary PC-based editor used to create the appearance and functionality of the GUI of FIG. 4.

Turning now to FIG. 9, the operation of the editing program 300 used to create the above-disclosed, exemplary GUI pages and associated functionality will be described in further detail. For this purpose, the PC screen display of the editor application may be divided into several windows or panels, each having a specific purpose. By way of example, the panels may be as follows:

Main project panel 902, used to display the current GUI page being edited (Home Page 400 in this illustration) together with a representation 922 of the hard keys (keys 414 through 420) available on target controlling device 100.

Project View panel 904, used to display all currently defined GUI pages in a tree structure form (which may, as depicted in the exemplary embodiment shown, have collapse [−] and expand [+] functionality including selective expansion of individual nodes and/or a collapse all/expand all feature) where the GUI page to be edited may be selected (e.g., by clicking on a link) from within the tree structure list and wherein the GUI page being displayed in the Main project panel 902 may be indicated by a highlight 918 (the Home Page in the instant illustration).

Properties panel 906, used to display a list of (and allow editing of—for example by text entry, selection from drop down menus, etc.) the properties (such as the caption text and font attributes, symbol position, button type, etc.) associated with a presently selected GUI icon or hard key image within Main project panel 902 (GUI icon or soft key 404' with label "DVD Movie" in this illustration, as indicated by the highlight (dotted line) around icon 404' displayed in Main project panel 902).

Gallery panel 908, used to display graphic images which may be dragged and dropped onto the GUI pages being edited wherein the Gallery choices may include sets of icons for use as buttons, page backgrounds, symbols for labeling buttons, key groups (to allow a group of related key icons, e.g. a numeric pad, to be dragged into place in a single operation), or to allow pre-defined themes to be applied to single pages or groups of pages and wherein the Gallery in use (when multiple, organized Galleries are provided) is selected via tabs 914 according to the exemplary embodiment shown.

Actions panel 910, used to display a list of (and allow editing of—for example by dragging and dropping to change the order, by deleting selected items, etc.) the actions to be performed by controlling device 100 when the currently selected icon (in the Main panel 902) is activated by a user when the user interface is provided to the controlling device (e.g., in the example presented, it can be seen that activating the "DVD Movie" icon 404' will: (1) transmit a "Power On" command to DVD player 106, (2) transmit a "Power On" command to TV set 102, (3) wait one second for the devices to stabilize, then (4) transmit a "Component 2" input selection command to TV 102, (5) transmit "DVD" input selection command to Audio Receiver 108, and finally (6) jump to GUI page 700 corresponding to the DVD transport controls (illustrated in FIGS. 7 and 10).

Devices panel 912 is preferably used to display a listing of all remote control commands available for each of the appliances setup to be controlled by controlling device 100 wherein the list of commandable functions for a given appliance to be displayed may be selected from a drop down list 916 (which in the illustrative example would comprise a TV 102, a cable STB 104, a DVD player 106, and an audio receiver 108) and wherein the commandable functions so displayed may be assigned to any icon displayed in main project panel 902 by simply clicking and dragging a commandable function icon to, for example, a desired location with a listing of functions displayed in the Actions panel 910 and/or over an icon displayed in the Main panel (where it would be added, for example, to the top or bottom of the listing of commands within the Action panel display).

Figure 7:
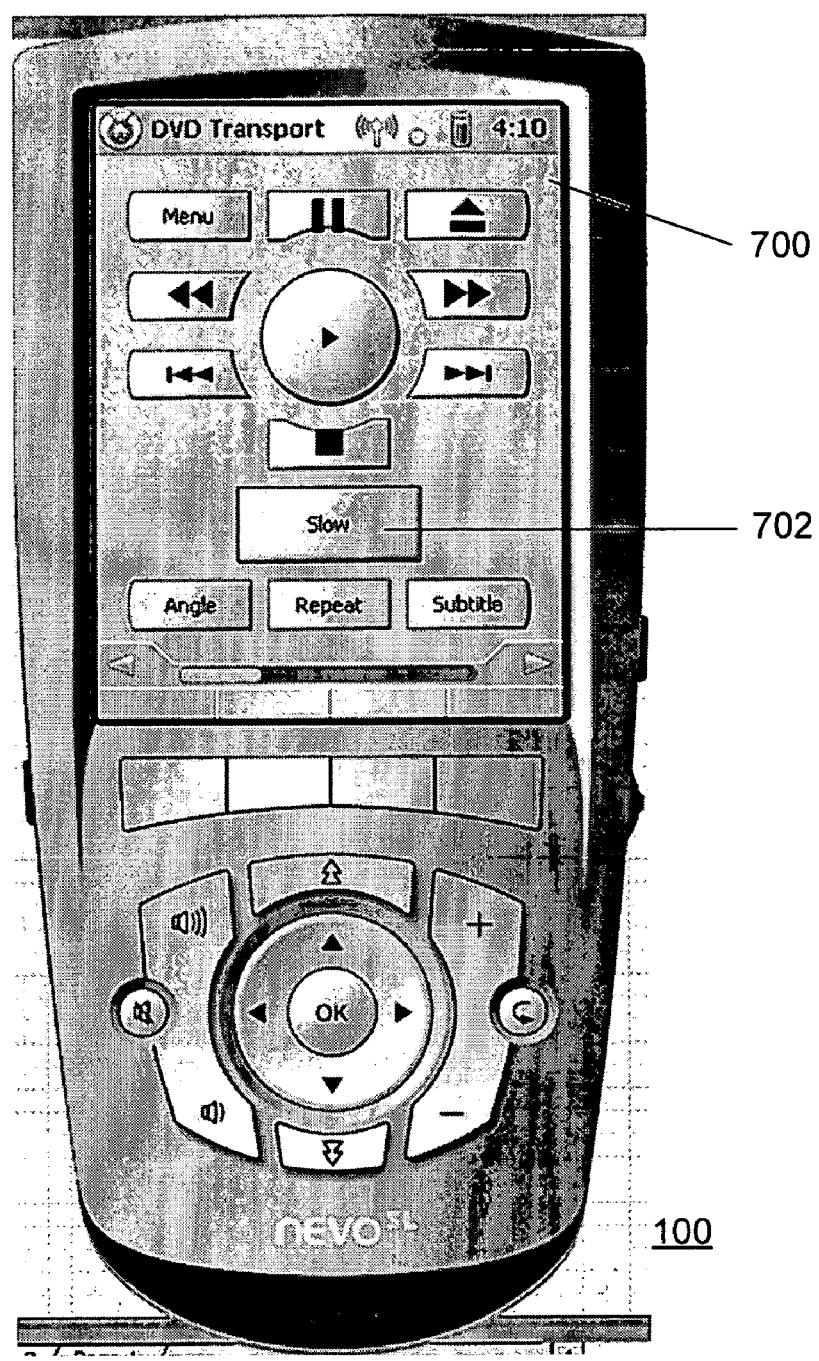
FIG. 7 illustrates another exemplary device control page GUI for the touch screen of a controlling device.
Figure 10:
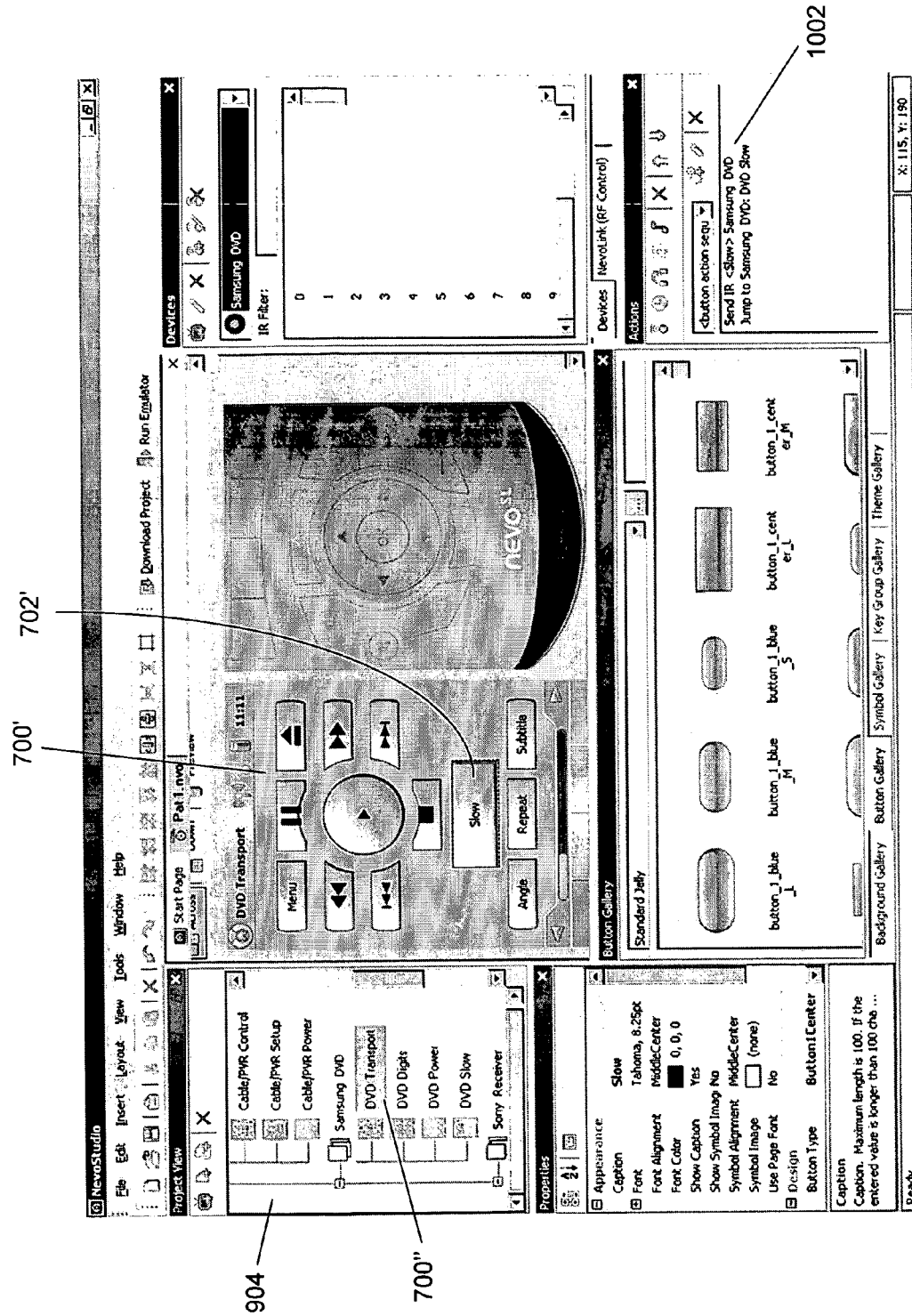
FIG. 10 illustrates an exemplary PC-based editor used to create the appearance and functionality of the GUI of FIG. 7.

Turning now to FIG. 10, wherein GUI page 700 has been loaded for editing by clicking on the appropriate entry icon 700" in the tree listing within Project View panel 904, it is seen that, in response to the selection of the "Slow" icon 702' in the Main panel, the Actions panel display 1002 shows a listing of the actions to be performed by the controlling device 100 when this icon is activated, i.e. transmit a "Slow" command to the DVD player and then jump to the DVD slow motion control page, as previously described in conjunction with FIG. 7.

Figure 8:
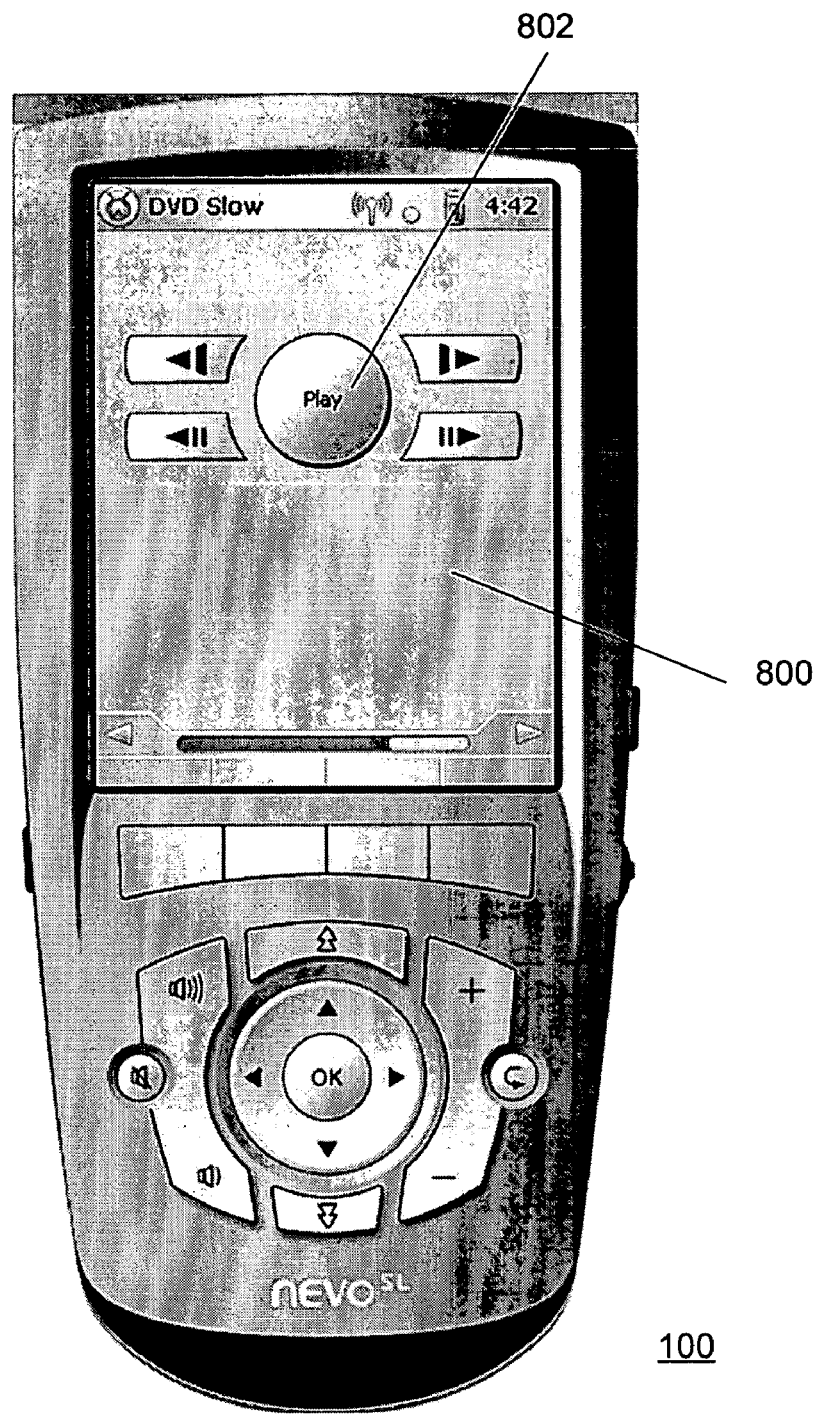
FIG. 8 illustrates yet another exemplary device control page GUI for the touch screen of a controlling device.
Figure 11:
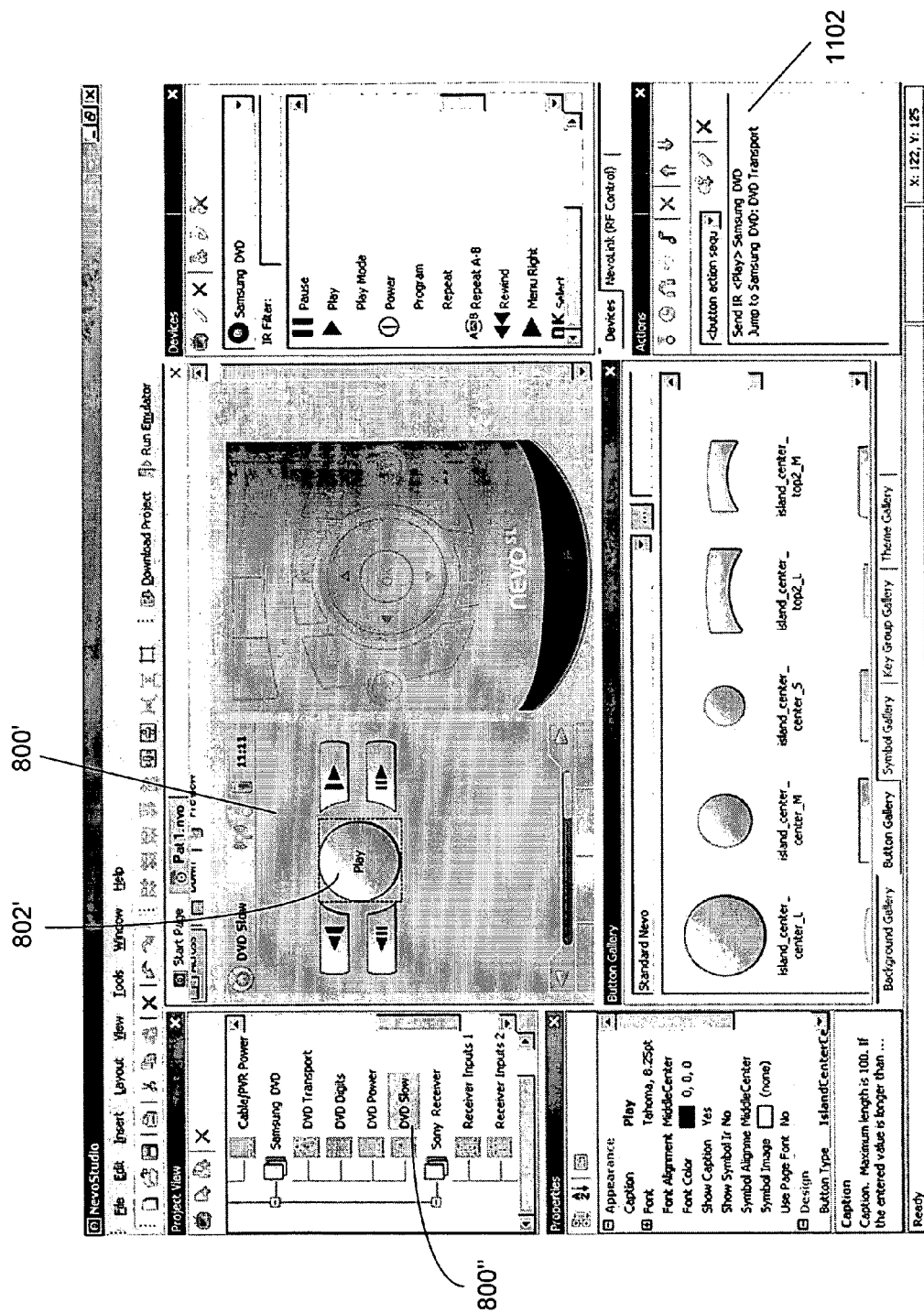
FIG. 11 illustrates an exemplary PC-based editor used to create the appearance and functionality of the GUI of FIG. 8.

Similarly, FIG. 11 illustrates a DVD slow motion control page 800' (instantiated in response to the selection of the "Samsung DVD"/"DVD slow" entry icon 800") and the actions to be performed by the controlling device 100 when the "Play" icon 802' is activated, i.e., transmit a "Resume normal speed play" command to the DVD player and jump to the DVD transport control page 700, as previously described in conjunction with FIG. 8. Again, the listing of functional commands 1102 is instantiated in response to the user selecting the "play" icon 802'.

Figure 5:
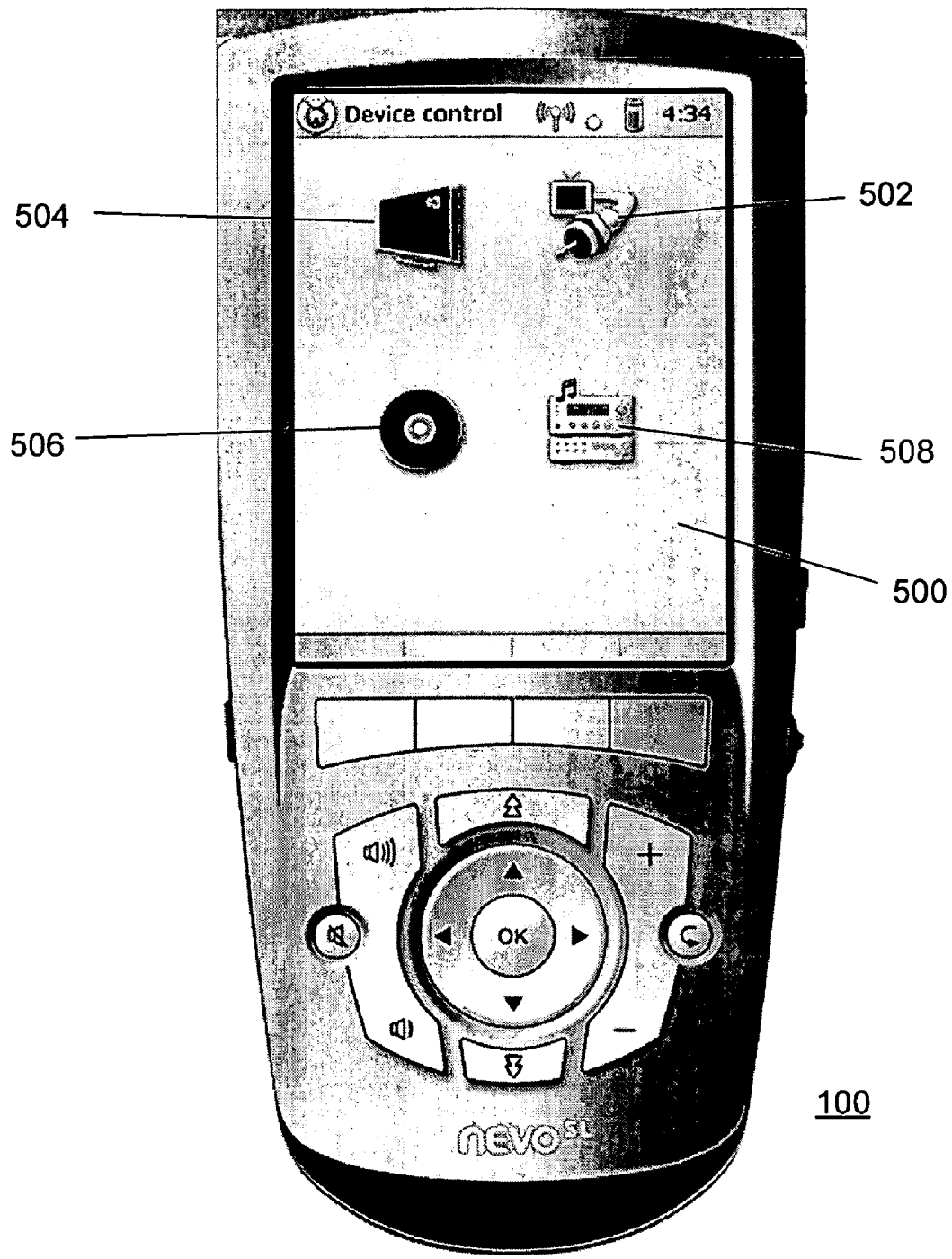
FIG. 5 illustrates an exemplary device selection page GUI for the touch screen of a controlling device.
Figure 6:
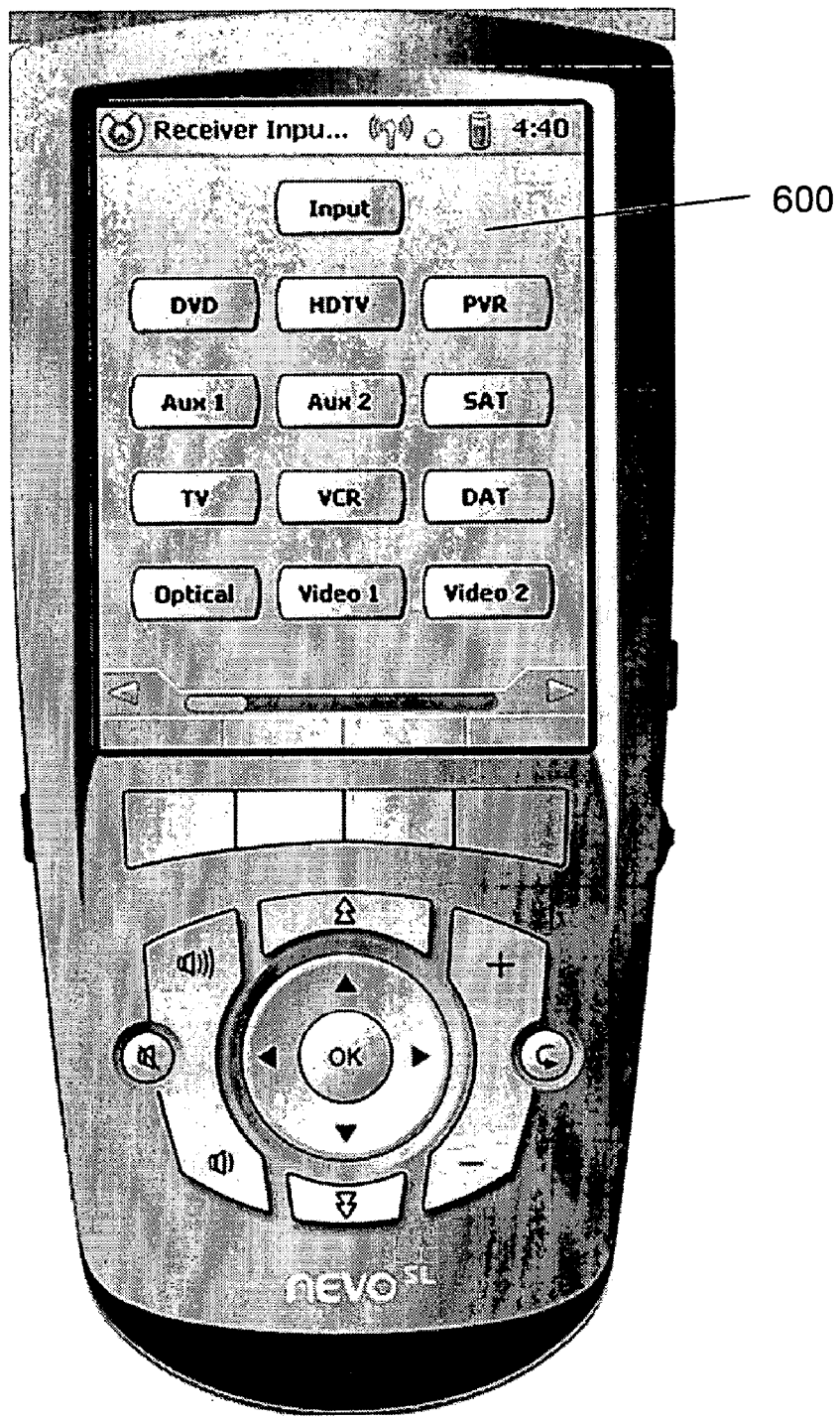
FIG. 6 illustrates an exemplary device control page GUI for the touch screen of a controlling device.
Figure 12:
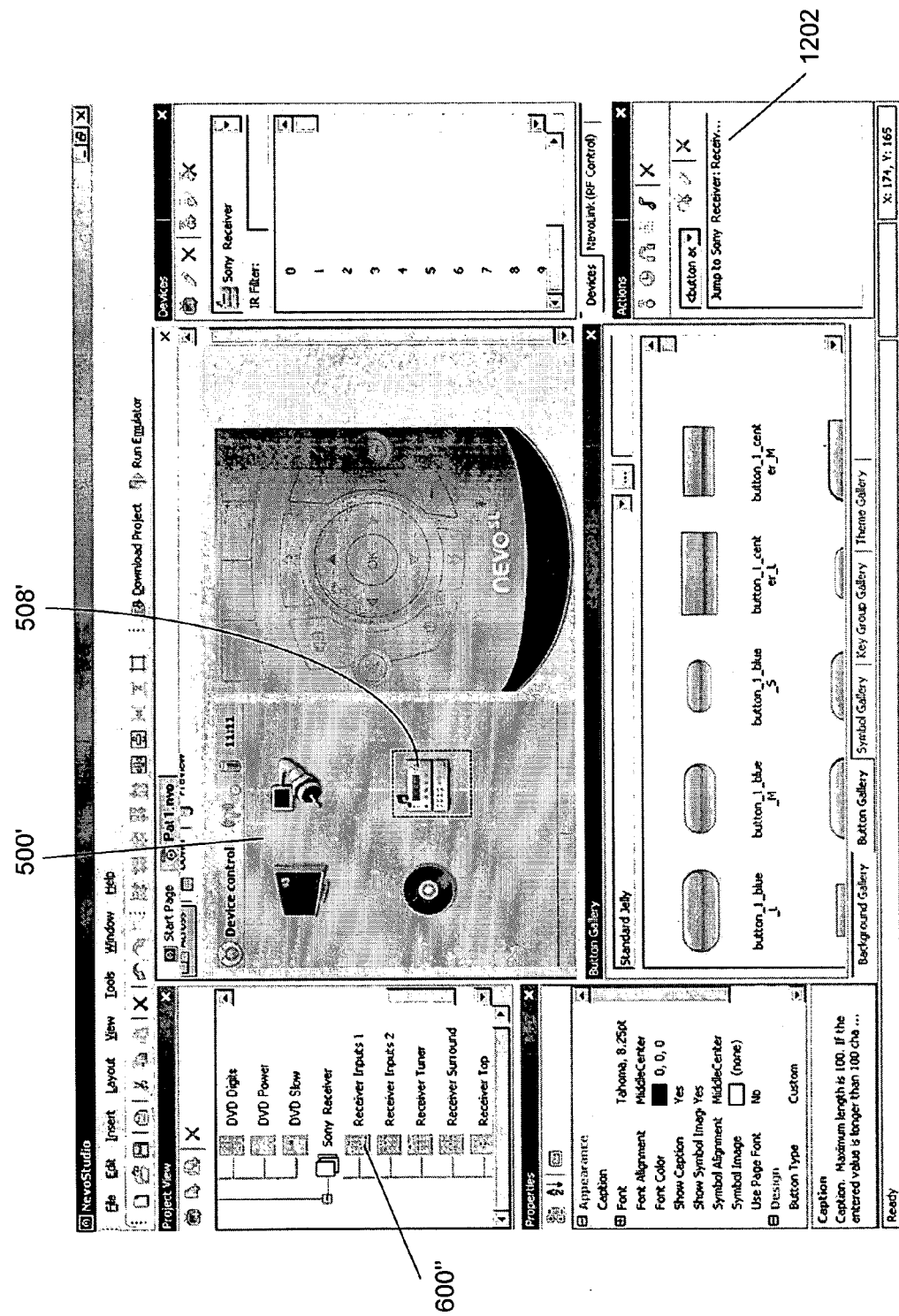
FIG. 12 illustrates an exemplary PC-based editor used to create the appearance and functionality of the GUI of FIG. 5.

FIG. 12 illustrates the editor representation of the devices GUI page of FIG. 5. As discussed, the icons on this page are used to jump directly to the individual device control page sets. As can be seen in Actions panel 1202, the exemplary selected icon 508' is programmed to send no commands, but rather to simply jump directly to the first page of the audio receiver page set 600", corresponding to FIG. 6 in the illustrated examples.

An exemplary set of data structures suitable for storing an editable GUI as a local file 310 on PC 302 will now be discussed. As will be appreciated by those of ordinary skill in the art, many other arrangements and data structures are feasible and accordingly those presented herein are intended to be way of example only, without limitation. Turning to FIG. 14, a top level listing of the exemplary contents of a GUI definition project file 310, corresponding to one editing project, is shown in tabular form. Such GUI definition project files may for example be stored on PC 302 as MICROSOFT "WINDOWS" cabinet files (similar to the more commonly known .zip archive file). As such, file 310 may comprise a container for other files. In the example presented, file 310 holds a number of XML files and a single resource file which together serve to define a controlling device GUI and its attributes.

Project definition file 1402 may comprise several sections, for example a ProjectSettings section 1500 (FIG. 15) which may contain system metadata and settings for controlling device 100, for example default backlight timeouts, display brightness, passwords, etc. The ProjectSettings section 1500 may also include a record of the location(s) from which various resources (button widgets, etc.) used in creating the GUI were drawn. Additionally, ProjectSettings section 1500 may include a project identity area 1502 holding data which identifies the author, revision, and target device for the project, this for use in managing and/or automating controlling device GUI updates as will be described further hereafter. Project definition file 1402 may further include sections such as, for example, a tabulation of global objects such as macros, an index listing of top-level objects, a manifest of all resources available, etc.

Sitemap file 1404, illustrated in FIG. 25, may contain data regarding nodes and edges used to construct a sitemap view of the GUI project (as described in the above referenced and related U.S. patent application Ser. No. 11/218,900).

The Page, Page Collection, Device, Nevo Link, and Media Zone files 1406 through 1414 each comprise an XML description of the corresponding object(s), and may, as appropriate for such object(s) be configured similarly. By way of example, a Page file 1406 will be described in further detail in conjunction with FIG. 17 wherein the root node 1700 of an exemplary typical XML Page file is illustrated. Page file root node 1700 may contain, for example, a page name 1702, data 1704 regarding the background image to be used for the page, information 1706 regarding properties inherited from other pages in the same group, etc. Also contained in exemplary root node 1700 may be a list of child nodes, one for each widget on the page, where a widget may be a button, key guide, etc. By way example, a button node 1710 may contain information regarding button image; label font, size, and placement; actions associated with the button, etc. It will also be noted that node 1710 includes child nodes 1712 and 1714 (MDA and MUA) which correspond to button down action and button up action respectively.

Finally, Resources file 1416 is a standard "MICROSOFT "WINDOWS .NET" resource file containing all the resources (images) used by the GUI project.

Figure 21:
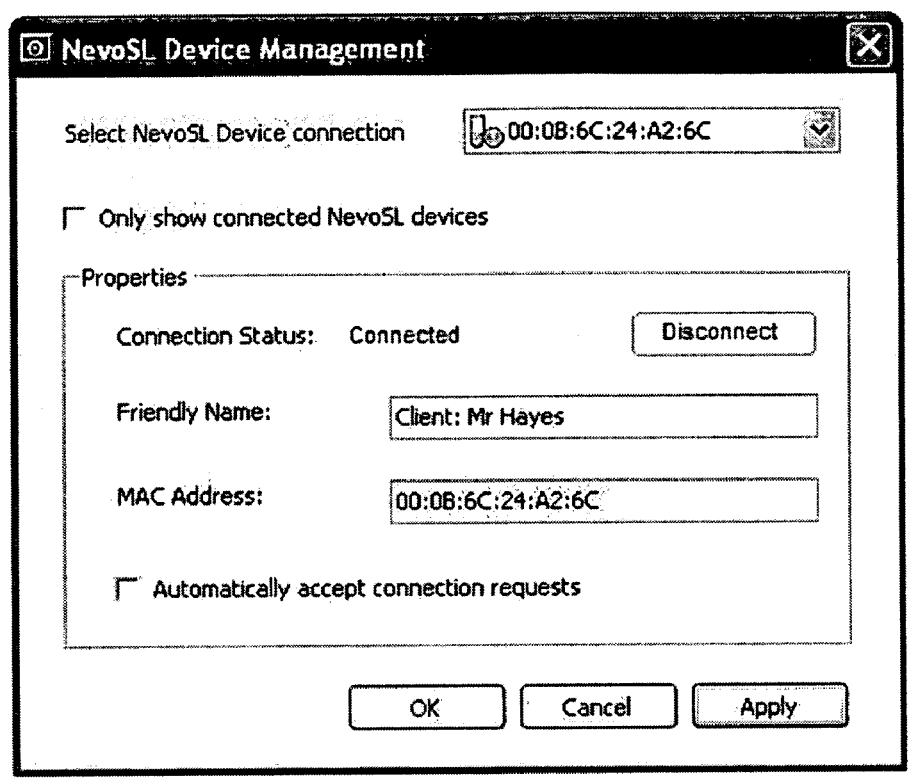
FIG. 21 illustrates an exemplary device identification display generated when a controlling device is connected to an editing system.

When a user of exemplary editor program 300 has completed creation and/or modification of a GUI configuration, the GUI configuration may be subsequently transferred to a controlling device 100 which has been physically placed into docking cradle 304. In this context it should be noted that every time a controlling device is docked with a PC system, editor program 300 may check the MAC (Media Access Control) address of the controlling device hardware against a table of MAC addresses of known (i.e., previously docked) devices. If it is determined that this is the first time this particular controlling device has been interfaced with this system, a dialog box (illustrated in FIG. 21) is preferably instantiated which allows the user of editor program 300 to enter additional identifying data regarding this device. Such data may then be available for subsequent use, for example, to populate certain fields in project identity area 1502.

Figure 13:
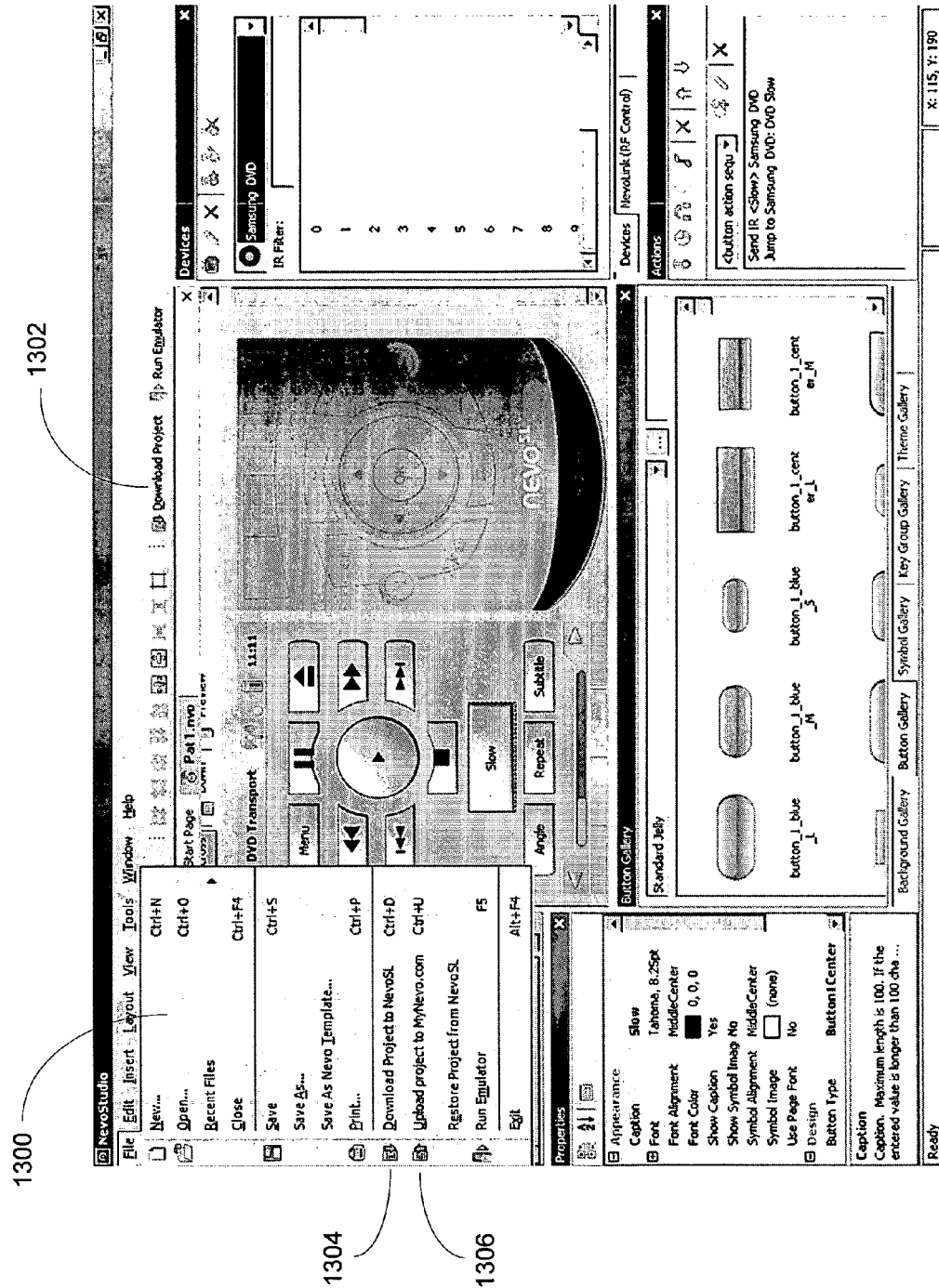
FIG. 13 illustrates an exemplary interface for downloading or uploading of project files created using the PC-based editor to the controlling device or to a central server, respectively.

Turning now to FIG. 13, transfer of a new or modified configuration and GUI to a docked controlling device may, for example, be initiated by clicking tab 1304 of drop-down menu 1300, causing editor program 300 to download a representation of the contents of the new or updated project file 310 into controlling device 100 via a wired connection using a connection protocol such as USB, RS232 serial, etc. In certain embodiments, a shortcut tab 1302 may also be provided as an alternative method of initiating download. Prior to downloading, editor program 300 may pre-process certain elements of the project file 310 data into a data structure 311 which may be in a format more suitable for direct use within controlling device 100, as described in greater detail in previously referenced U.S. patent application Ser. No. 11/218, 900 of which this is application is a continuation-in-part.

In other embodiments, it may be desirable to transfer updated configuration data structure 311 to a controlling device 100 via a wireless link 306 such as for example WiFi (IEEE 802.11x), Bluetooth, etc. In this case and in certain embodiments it may be preferable for the transfer process to be initiated from controlling device 100 rather than from the PC-based editor program 300. To this end, controlling device 100 may be provided with a selectable option under its "Settings" menu titled, for example, "Connect."

Figure 18:
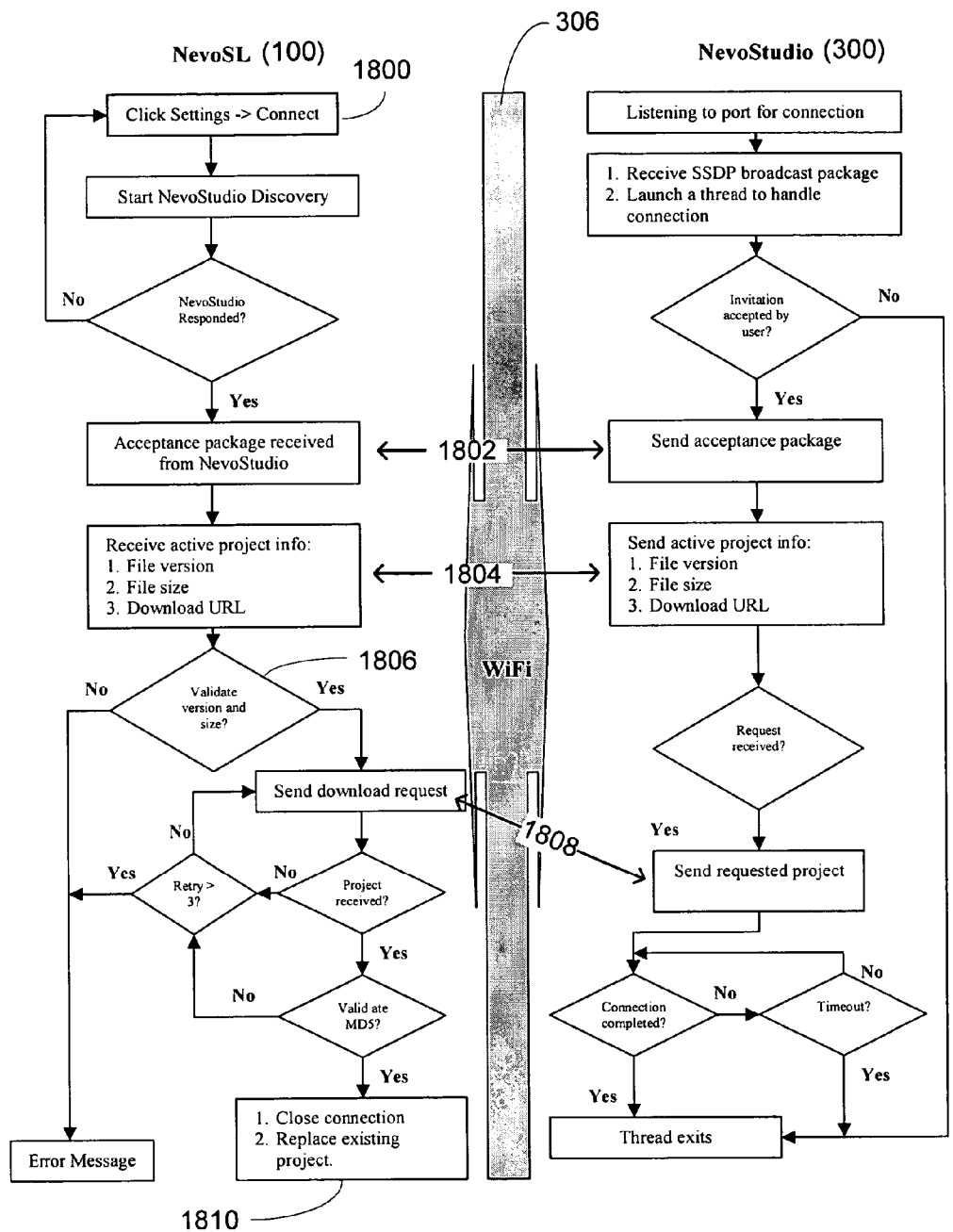
FIG. 18 illustrates an exemplary method of downloading project files created using the PC-based editor to the controlling device over a wireless link.

In the method of an exemplary embodiment illustrated in FIG. 18, user activation of the "Connect" option 1800 may cause a controlling device 100 to initiate a wireless discovery process using for example SSDP (Simple Service Discovery Protocol) to seek any appropriately configured PC based editor program 300 within the applicable wireless communication range of controlling device 100. If one is found, a connection may then be established and information exchanged 1802, 1804 which serves to identify to the controlling device which, if any, of the active project files 310 stored on PC 302 may be applicable. In this context an active project file may comprise the one most recently edited, all files edited within a specified period of time, all those which have not previously been downloaded, only files located in a particular directory, etc., as appropriate. If the controlling device makes a determination 1806 that an updated version of a project file exists, the download process 1808 is initiated. Upon completion of the download process and, optionally, after validation of any check data, the new configuration is installed 1810 and the connection between the devices is preferably closed. In the illustrated exemplary embodiment MD5 (Message-Digest algorithm 5), a well known cryptographic hash function, is used to generate a 128-bit checksum to validate the integrity of the downloaded file, though it will be appreciated that many other methods are possible. It will also be appreciated that while this process is manually initiated via a "Download" selection in the above exemplary embodiment, as an alternative it may be automatically initiated on a periodic basis, either by user option or as a standard feature.

Figure 19:
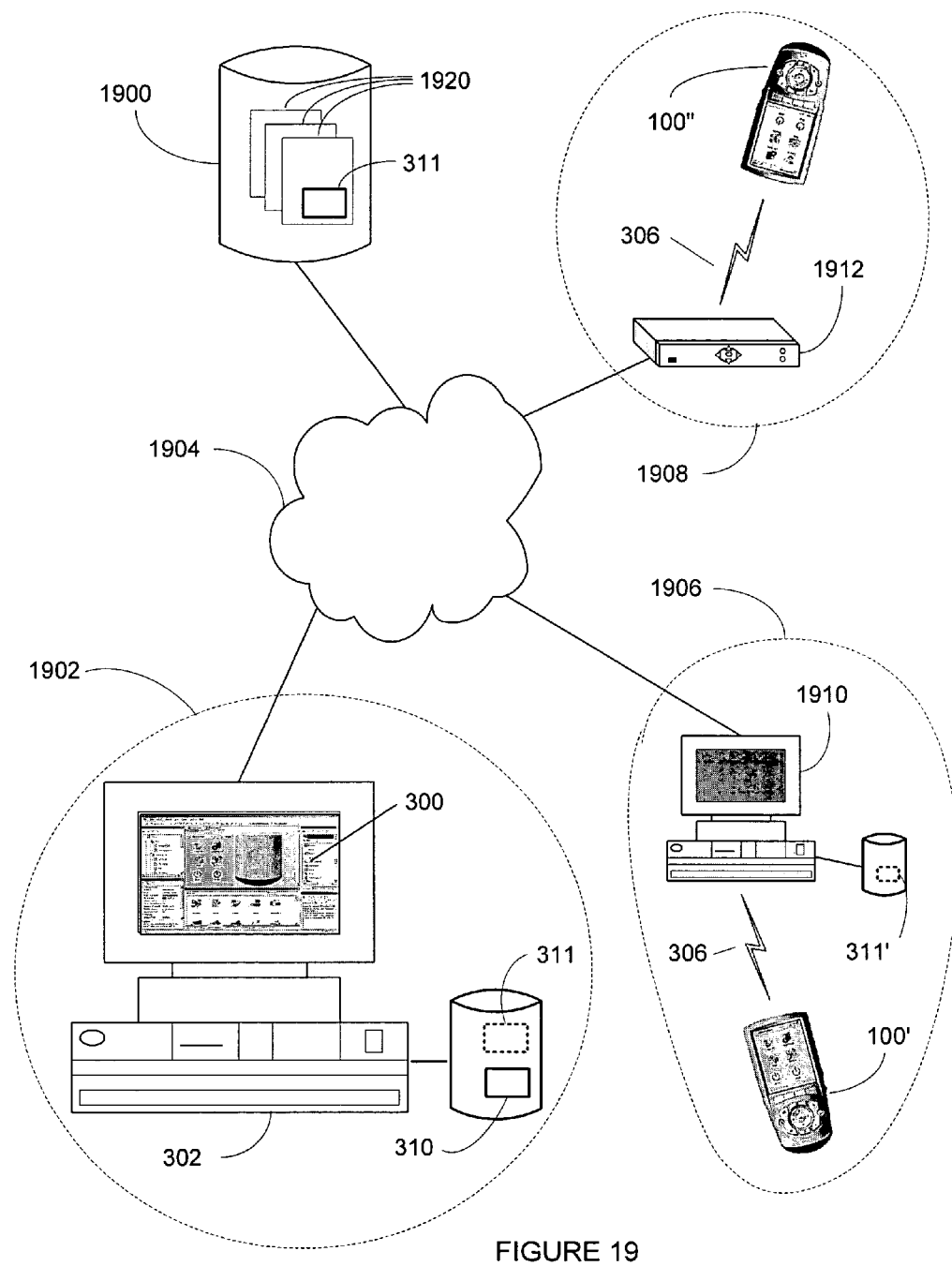
FIG. 19 illustrates an exemplary system in which project files created at one location and uploaded to a server may be downloaded by one or more controlling devices at other locations.

Turning now to FIG. 19, in certain applications where, for example, a controlling device GUI has been designed and configured for a consumer by a third party, such as a professional installer performing a turnkey installation of a home theater system, it may be advantageous if a controlling device configuration in need of future updating could be edited at a location which is remote from the consumer's system (e.g., the installers office) and subsequently downloaded to the consumer's controlling device(s) via the Internet, PSTN (including both LAN-line and wireless telephony networks), or other convenient data communication means. To this end a centralized sharing service 1900 may be provided, for example by the manufacturer of the controlling device, to facilitate such a feature. A project file 310 corresponding to a controlling device configuration and graphical user interface may be created or modified at one site 1902 and uploaded, in the form of a data structure 311 suitable for use by a controlling device 100, to a central server 1900 via Internet 1904 (or other suitable communication means) where it may be stored together with indicia identifying the origin, target, and version of the uploaded data. Other controlling devices 100', 100" at locations 1906, 1908 may then periodically check the central server 1900 for revised configuration data with indicia that matches the origin of their currently installed GUI and configuration, and if a later revision is found, download the revised data structure(s) 311 and update themselves accordingly. Controlling devices may communicate with server 1900 using a PC 1910 or other device 1912 as a gateway to the Internet, PSTN, etc., (collectively, "gateways.") In one embodiment local communication between a controlling device and a gateway may be wireless using WiFi (IEEE 802.11), Bluetooth, Zigbee, or any other suitable protocol. In an alternative embodiment (not illustrated) data structure 311 may be temporarily downloaded to a users's PC and subsequently transferred to a docked controlling device 100' via a wired connection in a manner similar to that described earlier. In yet another alternative embodiment data structure 311 may be downloaded directly to an appropriate configured controlling device via a mobile PSTN (i.e. GSM, CDMA, and the like).

Figure 22:
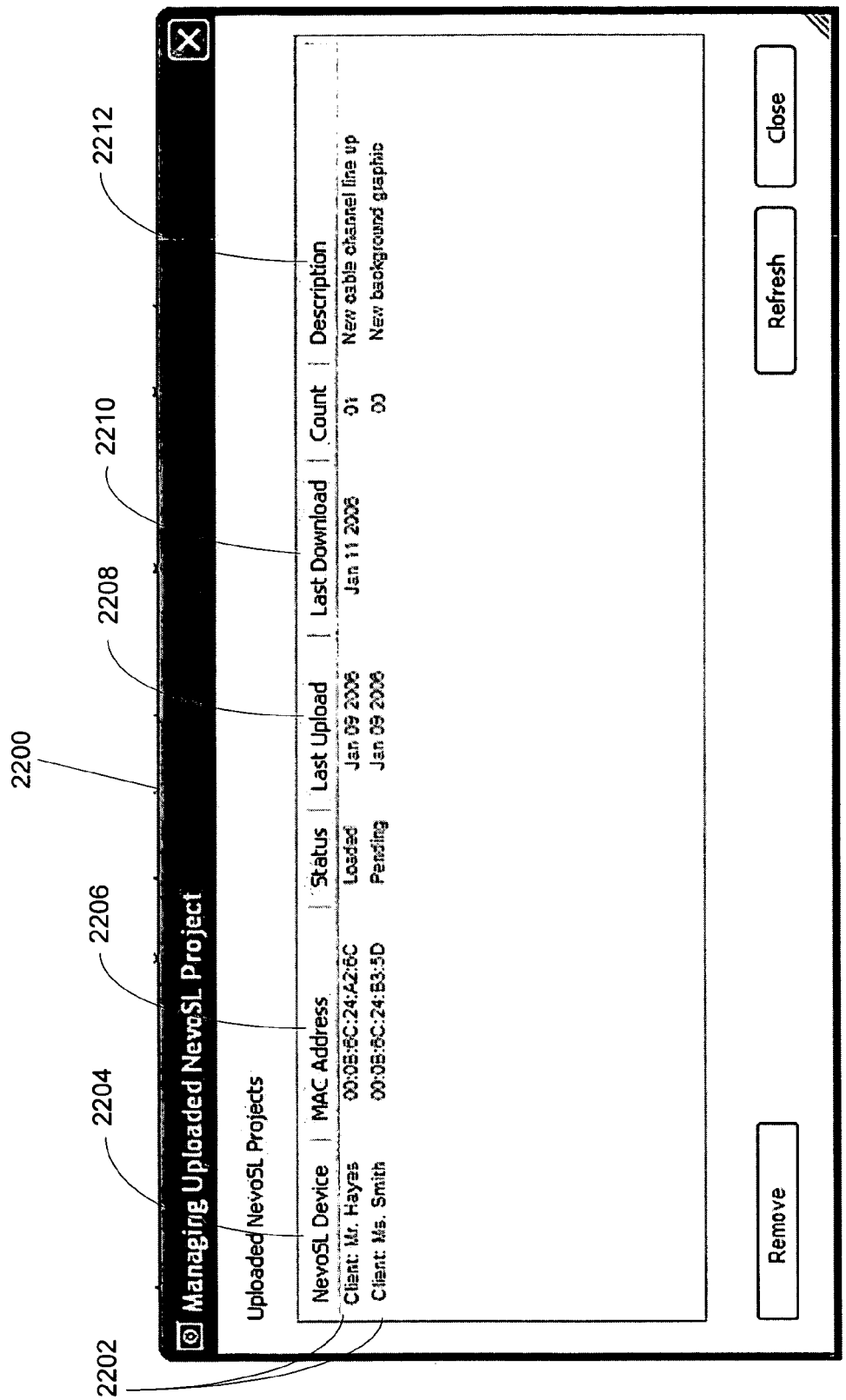
FIG. 22 illustrates an exemplary interface used to administer project files which have been uploaded to a central server.

To further facilitate this configuration sharing process, server 1900 may include multiple file storage areas 1920 each assigned to a particular installer authoring system 1902 and identified by a unique installer ID which may be assigned when an installer first registers with server 1900. It will be understood that an "installer" need not be limited to the aforementioned professional but may include any party which uses the editor system and which is authorized to use, e.g., registered with, the central server system. The installer ID may also be stored by editor program 300 of system 1902 for use in populating the project identity area 1502 of project file(s) 310. Once registered, an installer may easily upload representations 311 of modified customer project files to server 1900, for example by clicking tab 1306 of drop-down menu 1300 (FIG. 13). Server 1900 may also provide installers with the ability to maintain and administer their uploaded files, either in conjunction with editor program 300 or as a separate utility. An exemplary interface 2200 for such a facility is illustrated in FIG. 22. Each uploaded project 311 currently resident in an installer's upload area 1920 is represented by a line entry 2200 identifying a client name 2204 and a MAC address 2206. Current status and last upload (from installer) and download (to client) dates 2208,2210 are also displayed together with an optional installer-entered descriptive annotation 2212. Using such an interface, an installer may delete, copy, update, etc. individual file entries as permitted by the server application.

Figure 20:
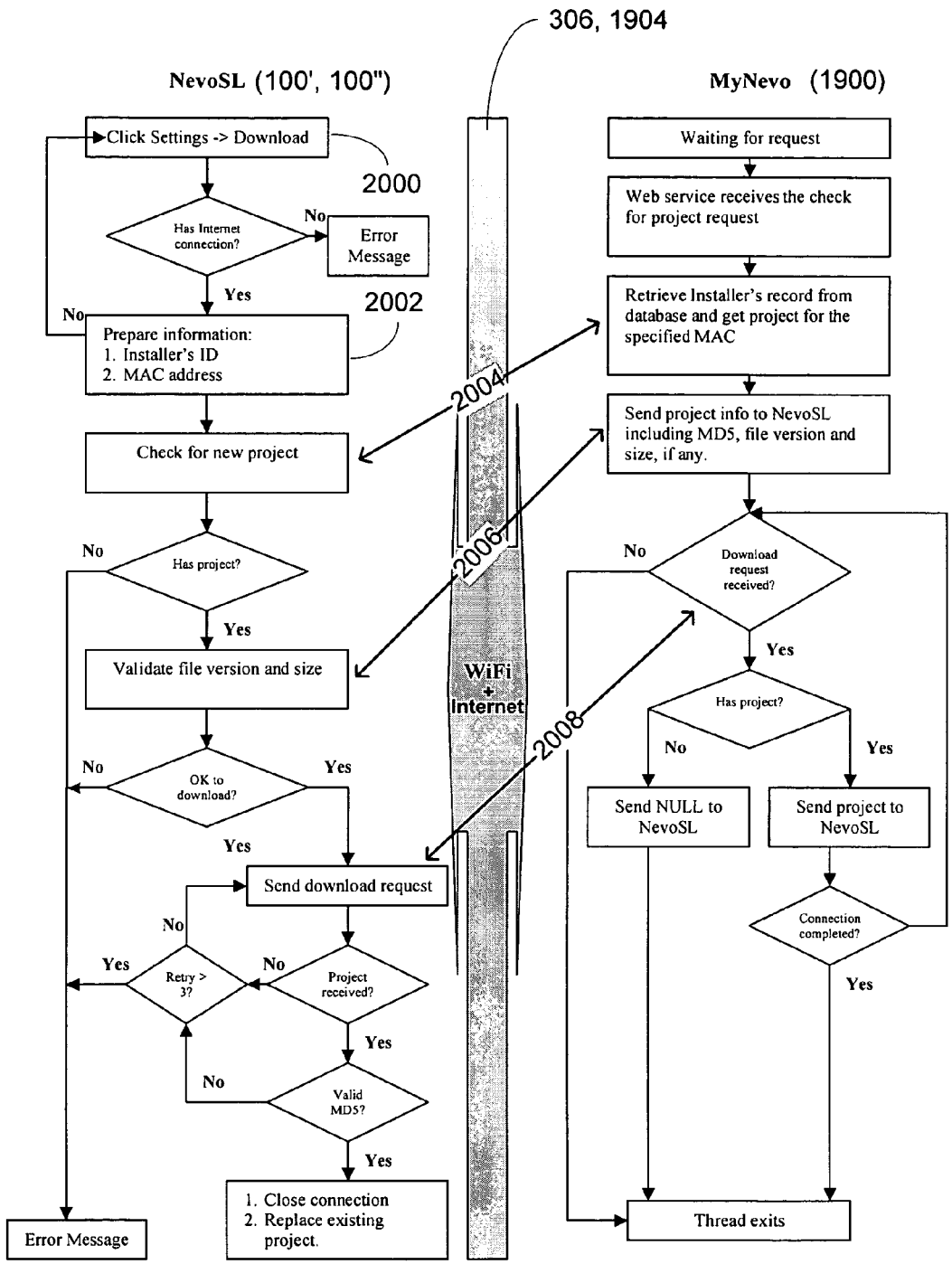
FIG. 20 illustrates an exemplary method of downloading sharable project files stored on central server to a controlling device.

Turning now to FIG. 20, there is illustrated an exemplary method for downloading such server-based configuration data to a controlling device. The controlling device may include a "Download" selection 2000 in its "Settings" menu, either in place of or in conjunction with the "Connect" selection 1800 available for local download. When "Download" is activated, provided the controlling device 100' or 100" currently has Internet access, the controlling device will prepare a unique identification value 2002 comprising an installer ID, i.e., the individual identification value assigned to the specific programmer/creator/supplier of it's currently installed GUI configuration, together with the MAC (Media Access Control) address of the controlling device itself, i.e., a unique identification value specific to this one device. Such Installer IDs may for example be assigned by the operator of central file sharing service 1900 as described above, or alternatively by the manufacturer of the controlling device and/or the author of the editor program 300, while MAC address assignment is managed by the IEEE in conjunction with the various manufacturers of networked hardware devices. This information may then be forwarded over the Internet to server 1900 as a Web service request. Server 1900 may correlate these values against the origin file area and target indicia associated with uploaded configuration data structure file(s) 311 in its database. If a match is found, the current file version and MD5 value of the stored configuration is returned 2006 to the requesting controlling device. If the controlling device then determines that the file version is newer than the file version that is currently installed, it issues a download request 2008 to server 1900, whereafter the downloading of the new data proceeds in manner similar to that previously described in connection with local wireless downloading of configurations from a PC into a controlling device. While the exemplary embodiment described above makes explicit use of a file version to determine if a download and update of the controlling device is appropriate, it will be understood that various other methods may be used. For example, a particular server implementation may automatically delete data structure files 311 from its database upon successful completion of a download, in which case the mere presence of a file may signal that it is newly edited; an MD5 or other hash or checksum value corresponding to the controlling device's currently installed file may be compared to that of the configuration presently stored at the server and an update performed if they differ; file creation dates, upload dates, or download dates may be compared; etc. It will also be appreciated that while this process is manually initiated via a "Download" selection in the above exemplary embodiment, as an alternative it may be automatically initiated on a periodic basis, either by user option or as a standard feature. It will also be noted that during this download process, in cases where the gateway device is a PC 1910, an intermediate copy 311' of the downloaded data structure file may be stored on the PC 1910, on either a temporary or permanent basis. When updating files in this manner, it will be appreciated that it may be desirable for the system, e.g., the controlling device and/or the PC, etc., to maintain a copy of the prior file version to thereby allow for the controlling device to the restored to its state prior to the upgrade. Still further, copies of prior file versions may be maintained at server 1900 for the same purpose.

While various concepts have been described in detail, it will be appreciated by those skilled in the art that various modifications and alternatives to those concepts could be developed in light of the overall teachings of the disclosure. For example, while the embodiments presented above are described in the context of universal remote controls (i.e., controlling devices capable of commanding the operation of multiple classes of appliances devices from multiple manufacturers) as being most broadly representative of controlling devices in general, it will be appreciated that the teachings of this disclosure may be equally well applied to other controlling devices of narrower capability, and also to any general or specific purpose device requiring a visual interface (i.e., display screens, signage devices, teleprompters, etc.) without departing from the spirit and scope of the present invention. Still further, it will be appreciated that the user interfaces described herein need not be limited to controlling devices but can be utilized in connection with any device having input elements wherein it is desired to convey information concerning such input elements. For example, the user interface may be utilized with devices such as calculators, phones, appliances, etc. having input elements having associated information conveying images in the form of alphanumeric and/or symbolic labels. Further yet, while in the exemplary embodiments described above the editable GUI definition project file 310 is locally pre-processed into a controlling device compatible format 311 prior to being uploaded to central server 1900 for distribution, it will be appreciated that in alternative embodiments the original project file data 310 itself may be uploaded instead and the pre-processing step performed at the server prior to downloading to a particular controlling device. This approach may be advantageous where, for example, several models or versions of controlling device with different capabilities (e.g. graphic resolution, color palette, etc.) share a common GUI style and layout. Also, while the exemplary embodiment described uploads and downloads entire project files, it will be appreciated that other embodiments may structure these files as a series of independently updatable segments, allowing items such as, for example, favorite channel assignments or logos to be modified without necessarily downloading the rest of the device GUI and configuration settings. Such a modular approach may be advantageous where, for example, a local service provider changes a channel line up creating a requirement for multiple controlling devices to be updated and not all of them necessarily have every attribute in common. It will thus be further appreciated that any type or portion of configuration settings and/or data, including but not limited to GUI files and elements, device actions, sequences, codes, driver updates, etc, may be used without limitation in connection with the inventive concepts described herein. It will also be understood that modification, editing, or updating of such configuration settings may be performed either by a user or though any automated computing processes as are well known in the art. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A system for managing distribution of a controlling device configuration data, comprising:
    a controlling device having programming that uses controlling device configuration data to command operation of at least one appliance;
    a computing device having programming used to modify controlling device configuration data; and
    a Web server having programming and an associated database used to store data associated with a modified controlling device configuration data uploaded from the computing device via a wide area network;
    wherein a one of multiple file storage areas of the server in which the data associated with the modified controlling device configuration data uploaded from the computing device is stored functions to indicate to the programming an identification of a specific creator that created the data associated with the modified controlling device configuration uploaded from the computing device; and wherein the data associated with the modified controlling device configuration uploaded from the computing device and stored in the one of the multiple storage areas of the server is provided with an identification of a target controlling device for the data associated with the modified controlling device configuration data uploaded from the computing device.

2. The system as recited in claim 1, wherein the programming receives a request to update a current controlling device configuration data, wherein the request includes data which functions to identify at least a creator of data to be used to update the current controlling device configuration data, and wherein the programming compares the data which functions to indentify a creator included in the request to the identification of a specific creator that created the modified controlling device configuration data stored in the database to determine if the data associated with the modified controlling device configuration data is for use in updating the current controlling device configuration data.

3. The system as recited in claim 2, wherein the request to update the current controlling device configuration data includes data which functions to identify a controlling device which utilizes the current controlling device configuration data and wherein the programming compares the data which functions to identify the controlling device included in the request to the identification of a target controlling device for data associated with the modified controlling device configuration data stored in the database to determine if data associated with the modified controlling device configuration data is for use in updating the current controlling device configuration data.

4. The system as recited in claim 1, wherein the data associated with the modified controlling device configuration data functions to define user interface pages having icons that are activatable to cause the controlling device to perform one or more functions including transmitting a command to an appliance and changing a configuration data page being displayed.

5. The system as recited claim 1, wherein the programming provides for allowing a specific creator that created the data associated with the modified controlling device configuration data to track downloads of the data associated with the modified controlling device configuration data from the database.

6. The system as recited in claim 5, wherein the database maintains data which functions to identify at least a Media Access Control address for a target controlling device for which the data associated with the modified controlling device configuration data has been requested.

7. The system as recited in claim 6, wherein the database maintains data which functions to identify at least a date the data associated with the modified controlling device configuration data was downloaded.

8. The system as recited claim 1, wherein the programming provides for allowing a specific creator that created the data associated with the modified controlling device configuration data to track uploads of the data associated with the modified controlling device configuration data from the database.

9. The system as recited in claim 1, wherein the configuration data comprises data associated with a controlling device user interface comprised of a plurality of user interface pages.

10. A method for managing distribution of a controlling device configuration data comprising:

storing data associated with a modified controlling device configuration data uploaded from a computing device via a wide area network to a database; and maintaining, via a server, an identification of a specific creator that created the data associated with the modified controlling device configuration data and an identification of a target controlling device for the data associated with the modified controlling device configuration data stored within the database;

wherein a one of multiple file storage areas of the server in which the data associated with the modified controlling device configuration data uploaded from the computing device is stored functions to provide the identification of the specific creator that created the data associated with the modified controlling device configuration uploaded from the computing device.

11. The method as recited in claim 10, comprising storing, within the database, data used to track downloads of the data associated with the modified controlling device configuration data from the database.

12. The method as recited in claim 10, comprising maintaining within the database data which functions to identify at least a Media Access Control address for a target controlling device into which the data associated with the modified controlling device configuration data is to be installed.

13. The method as recited in claim 12, wherein the database maintains data which functions to identify at least a date the data associated with the modified controlling device configuration data was downloaded.

14. The method as recited in claim 10, comprising storing with the database data which allows a particular creator that created the data associated with the modified controlling device configuration data to track uploads of the data associated with the modified controlling device configuration data to the database.

15. The method as recited in claim 10, wherein storing data associated with the modified controlling device configuration data comprises storing data associated with a controlling device user interface comprised of a plurality of user interface pages.

\* \* \* \* \*